United States Patent
Yamamoto et al.

(10) Patent No.: US 7,109,639 B2
(45) Date of Patent: Sep. 19, 2006

(54) VIBRATION-TYPE DRIVING DEVICE, CONTROL APPARATUS FOR CONTROLLING THE DRIVING OF THE VIBRATION-TYPE DRIVING DEVICE, AND ELECTRONIC EQUIPMENT HAVING THE VIBRATION-TYPE DRIVING DEVICE AND THE CONTROL APPARATUS

(75) Inventors: Shinji Yamamoto, Kanagawa (JP); Nobuyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/180,804

(22) Filed: Jul. 13, 2005

(65) Prior Publication Data

US 2005/0242686 A1    Nov. 3, 2005

Related U.S. Application Data

(62) Division of application No. 10/804,343, filed on Mar. 19, 2004.

(30) Foreign Application Priority Data

Mar. 28, 2003 (JP) .............................. 2003-092783
Apr. 11, 2003 (JP) .............................. 2003-108325

(51) Int. Cl.
  *H02N 2/00* (2006.01)
  *H02N 2/08* (2006.01)

(52) U.S. Cl. ........................... 310/323.16; 310/323.01; 310/323.02; 310/323.03; 310/323.04

(58) Field of Classification Search ........... 310/316.01, 310/323
See application file for complete search history.

(56) References Cited

U.S. PATENT DOCUMENTS 5,136,200 A * 8/1992 Takizawa et al. ...... 310/323.16
5,698,930 A    12/1997 Takagi

FOREIGN PATENT DOCUMENTS

JP            6-311765         4/1994

* cited by examiner

*Primary Examiner*—Tran Nguyen
*Assistant Examiner*—J. Aguirrechea
(74) *Attorney, Agent, or Firm*—Canon USA INC I.P. Div

(57) ABSTRACT

A vibration-type driving device comprises a vibration element including a driving member and an electro-mechanical energy conversion element having an electrode and arranged to displace the driving member with a driving signal supplied to the electrode, and a driven element that is kept in contact with the driving member of the vibration element. According to the driving signal supplied to the electrode of the electro-mechanical energy conversion element, the vibration element excites vibrations in two flexural vibration modes in which a direction of generation of a node in one mode is perpendicular to that in the other mode. With the use of the two flexural vibration modes, the natural vibration frequency of the vibration element can be prevented from increasing, and the position of a node occurring in one flexural vibration mode and the position of an antinode occurring in the other flexural vibration mode can be made to coincide with each other, so that the amount of displacement of the driving member can be made large.

9 Claims, 21 Drawing Sheets

MODE-A

MODE-B

| | |
|---|---|
| L4 | SAME AS L2 |
| L5 | SAME AS L3 |
| L6 | SAME AS L2 |
| L7 | SAME AS L3 |
| L8 | SAME AS L2 |
| L9 | SAME AS L3 |
| L10 | SAME AS L2 |

MODE-A

MODE-B

| L4 | SAME AS L2 |
| L5 | SAME AS L3 |
| L6 | SAME AS L2 |
| L7 | SAME AS L3 |

| L9 | SAME AS L3 |
| L10 | SAME AS L8 |
| L11 | SAME AS L3 |
| L12 | SAME AS L8 |

| | |
|---|---|
| L4 | SAME AS L2 |
| L5 | SAME AS L3 |
| L6 | SAME AS L2 |
| L7 | SAME AS L3 |
| L8 | SAME AS L2 |
| L9 | SAME AS L3 |
| L10 | SAME AS L2 |

| | |
|---|---|
| L4 | SAME AS L2 |
| L5 | SAME AS L3 |
| L6 | SAME AS L2 |
| L7 | SAME AS L3 |

| | |
|---|---|
| L9 | SAME AS L3 |
| L10 | SAME AS L8 |
| L11 | SAME AS L3 |
| L12 | SAME AS L8 |

MODE-A

MODE-B

MODE-A    MODE-B

DURING HIGH-SPEED DRIVING

DURING LOW-SPEED DRIVING

DURING HIGH-SPEED DRIVING

DURING LOW-SPEED DRIVING

PRIOR ART

VIBRATION-TYPE DRIVING DEVICE, CONTROL APPARATUS FOR CONTROLLING THE DRIVING OF THE VIBRATION-TYPE DRIVING DEVICE, AND ELECTRONIC EQUIPMENT HAVING THE VIBRATION-TYPE DRIVING DEVICE AND THE CONTROL APPARATUS

CROSS REFERENCE TO RELATED APPLICATIONS

This application is a division of application Ser. No. 10/804,343, filed Mar. 19, 2004, which claims the benefit of Japanese Application 2003-092783, filed Mar. 28, 2003, and Japanese Application 2003-108325, filed Apr. 11, 2003, the entire contents of which are incorporated by reference herein.

BACKGROUND OF THE INVENTION

1. Field of the Invention

The present invention relates to a vibration-type driving device having a vibration element and a driven element, and more particularly to the structural arrangement of the vibration element.

2. Description of Related Art

Various conventional ultrasonic actuators for linear motion include a flat-plate-like vibration element. U.S. Pat. No. 5,698,930, for example, discloses such an ultrasonic actuator, which has an elastic body formed as a flat-plate-like vibration element. Vibrations can occur in the flat-plate-like vibration element in both a longitudinal vibration (oscillation) mode and flexural vibration mode. Also, displacement motions caused by vibrations in these modes are combined with each other to generate an elliptical movement or circular movement.

Another element (member) known as the driven element is kept in contact with the plate-like vibration element to cause relative movement between both elements.

Another example of an ultrasonic actuator with a flat-plate-like vibration element is disclosed in Japanese Laid-Open Patent Application No. Hei 6-311765. Here, the flat-plate-like vibration element is excited in two flexural vibrations. The structural arrangement of that vibration element is described with reference to FIGS. 35A, 35B and 35C.

In FIG. 35A, there is shown a flat-plate-like elastic body 100. A piezoelectric element 101 is bonded to one surface of the elastic body 100. Vibrations occur in a first flexural vibration mode, the behavior of which is shown in FIG. 35B, and in a second (out-of-plane) flexural vibration mode, the behavior of which is shown in FIG. 35C.

The behavior of vibration shown in FIG. 35B indicates that the first flexural vibration mode has cross-like nodes $X_1$ and $Y_1$, in which vibratory displacement motions in the Z direction are caused at protruding portions 102a, 102b, 102c and 102d. The behavior of vibration shown in FIG. 35C indicates that the second, out-of-plane flexural vibration mode has two nodes $X_2$ and $X_3$ in the Y direction, in which vibratory displacement motions in the X direction are caused at the protruding portions 102a to 102d.

In FIG. 35A, the driven element (an element to be driven), not shown, is disposed on contact portions 105a, 105b, 105c and 105d, on the tips of the protruding portions 102a to 102d. The driven element is kept in pressure contact with the contact portions 105a to 105d.

Vibratory displacement motions caused by the first and second flexural vibrations are combined with each other, so that an elliptical movement can be generated within the X-Z plane on the tips of the protruding portions 102a to 102d. Accordingly, the vibration element and the driven element can be moved relative to each other.

However, there are disadvantages associated with the above-described conventional vibration-type driving devices. In the first type (U.S. Pat. No. 5,698,930), which excites flexural vibration and longitudinal vibration, vibrations are excited at the plate-like elastic body in a longitudinal-vibration primary mode, so that it is difficult to reduce the size of the plate-like vibration element because an increased resonance frequency can result. Correspondingly, the vibration amplitude of the elliptical movement cannot be enlarged. This can cause driving performance to fluctuate in individual driving devices.

In the second type, which excites two flexural vibrations, vibrations are excited at the plate-like elastic body in the second, out-of-plane flexural vibration mode of FIG. 35C, so that there is an advantage in reducing the size of the elastic body. However, in the first vibration mode of FIG. 35B, cross-like nodes occur in this flexural vibration mode, so that the distribution of strains becomes complicated. Accordingly, some measures are required to excite such vibrations.

Further, the protruding portions 102a to 102d are distant from positions that cause the maximum amount of displacement in the Z direction in the flexural vibration mode shown in FIG. 35B. Therefore, it is difficult to provide sufficient amount of vibratory displacement to the protruding portions 102a to 102d, and to exert a larger driving force on the driven element.

SUMMARY OF THE INVENTION

In accordance with one aspect of the present invention, a vibration-type driving device is disclosed. The vibration-type driving device has a vibration element which further includes a driving member and an electro-mechanical energy conversion element having an electrode. The electro-mechanical energy conversion element uses a driving signal supplied to the electrode to displace the driving member. The vibration-type device further includes a driven element in contact with the driving member. Using the driving signal, the vibration element excites vibrations in two flexural vibration modes in which a direction of generation of a node in one mode is not parallel to that in the other mode. For example, the direction of generation of a node in one mode may be perpendicular to the direction of generation of a node in the other mode.

With the vibration-type driving device configured as mentioned above, it is possible to prevent a natural vibration frequency of the vibration element from increasing, and it is also possible to make the position of a node occurring in one flexural vibration mode and the position of an antinode occurring in the other flexural vibration mode coincide with each other.

In accordance with another aspect of the present invention, there is provided a vibration-type driving device comprising a vibration element including an elastic body and an electro-mechanical energy conversion element having at least two electrodes and arranged to cause the elastic body to excite vibrations with two driving voltages of respective phases having the same frequency applied to the two electrodes, and a driven element that is kept in contact with the elastic body, wherein the vibration element is capable of forming a first flexural vibration mode in response to inputting of the two driving voltages of respective phases that are made the same and is capable of forming a second flexural vibration mode in response to inputting of the two driving voltages of respective phases that are made opposite to each other, and wherein the first flexural vibration mode and the second flexural vibration mode are combined to drive the vibration element and the driven element relative to each other.

With the vibration-type driving device configured as mentioned above, it is possible to make the electrode pattern of the electro-mechanical energy conversion element have simpler arrangement.

In accordance with a further aspect of the present invention, there is provided a control apparatus comprising an arithmetic circuit for controlling the vibration-type driving device.

The above and further aspects, features and advantages of the present invention will become apparent to those skilled in the art upon reading of the following detailed description of preferred embodiments thereof when taken in conjunction with the accompanying drawings.

DETAILED DESCRIPTION OF THE INVENTION

Embodiments of the present invention will be described in detail with reference to the drawings.

(First Embodiment)

Figure 1A:
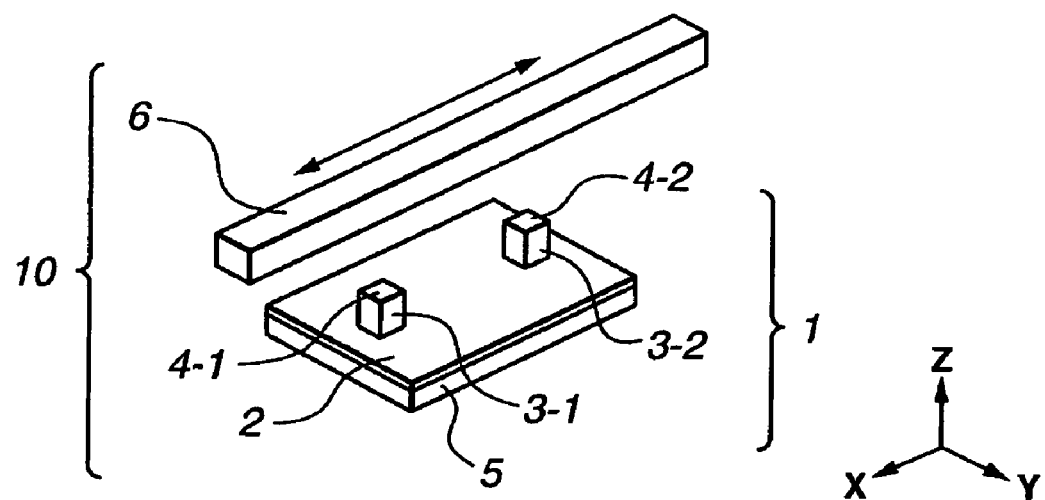
FIGS. 1A and 1B are perspective views showing a vibration-type driving device according to a first embodiment of the invention.
Figure 1B:
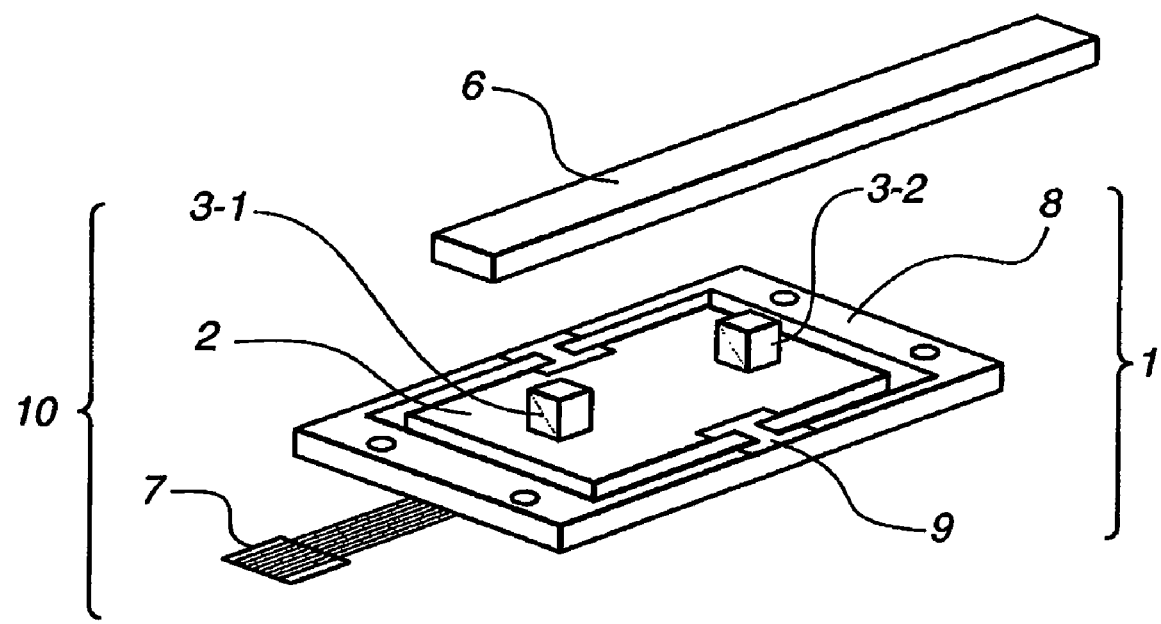

FIGS. 1A and 1B are perspective views showing the appearance of a linear-type ultrasonic actuator 10 serving as a vibration-type driving device according to a first embodiment of the invention.

In FIG. 1A, the linear-type ultrasonic actuator 10 is composed of a vibration element 1 and a linear slider 6.

The vibration element 1 is composed of a multi-layer piezoelectric element 5 formed into a rectangular thin-plate shape, and a driving plate 2 made of an elastic body and bonded integrally to one end surface of the multi-layer piezoelectric element 5. The multi-layer piezoelectric element 5 also has a plurality of thin-plate-like piezoelectric element films each having electrodes on the front surface thereof. The multi-layer piezoelectric element 5 is an electro-mechanical energy conversion element in which mechanical displacement occurs in response to an electrical signal being supplied thereto. Preferably, the size of the multi-layer piezoelectric element 5 may be approximately 10×6×0.6 (mm).

The driving plate 2 has a plate portion formed into a rectangular shape, and two protruding portions 3-1 and 3-2 each formed into a protrusive shape on the top surface of the plate portion. On the tip surfaces of the protruding portions 3-1 and 3-2, there are formed contact portions 4-1 and 4-2, which are arranged to be kept in contact with the linear slider 6, which is a driven element. Thus, the protruding portions 3-1 and 3-2 are kept in contact with the linear slider 6 and then act as a driving member for moving the linear slider 6 relative to the vibration element 1.

Stainless steel, which excels in vibration characteristics, is used for the driving plate material. The stainless steel is also heat-treated since the contact portions 4-1 and 4-2 require good a friction factor, abrasion resistance, or the like.

It should be noted that the material of the driving plate 2 is not limited to stainless steel and may be another metal as in conventional vibration-type driving devices.

The protruding portions 3-1 and 3-2 are formed integrally with the driving plate 2 by means of press working or the like. Here, the protruding portions 3-1 and 3-2 and the driving plate 2 may be formed separately and then fixed to each other, but the integral formation thereof can produce such advantageous effects that it is possible to reduce the number of required parts and cost, it is possible to increase the assembly productivity of devices because of a reduction in the number of steps of assembly work, and it is possible to prevent precision fluctuations in individual parts because of positioning of parts being unnecessary.

FIG. 1B illustrates the structural arrangement for supporting the vibration element 1. As shown in FIG. 1B, a multi-layer piezoelectric element 5 is fixed to a printed circuit board 7, which supplies a driving signal (a driving voltage) to the multi-layer piezoelectric element 5. Also shown is a stationary member 8 fixed to an apparatus so as to mount the ultrasonic actuator 10 thereon. A support member 9 mounts the vibration element 1 on the stationary member 8 to allow vibration of the vibration element 1 and is arranged to bring the vibration element 1 into pressure contact with the slider 6. Although not shown, other structural members can be employed for supporting the vibration element 1, which may include fixing means for fixing the vibration element 1 in such a manner as not to hider the vibration thereof, means for bringing the vibration element and the driven element into pressure contact with each other, and means for supplying a driving signal to the piezoelectric element. Hereinafter, for the purpose of simplification, the printed circuit board 7, the stationary member 8 and the support member 9 will be omitted from the description of the structural arrangement of the vibration element 1. Note that an exemplary size of the vibration element 1 including the protruding portions 3-1 and 3-2 is 10×6×2 (mm).

Figure 2A:
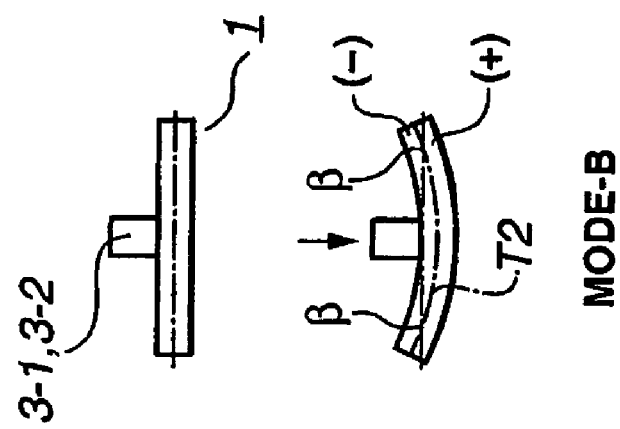
FIGS. 2A and 2B are diagrams illustrating vibration modes of a vibration element of the first embodiment.
Figure 2B:
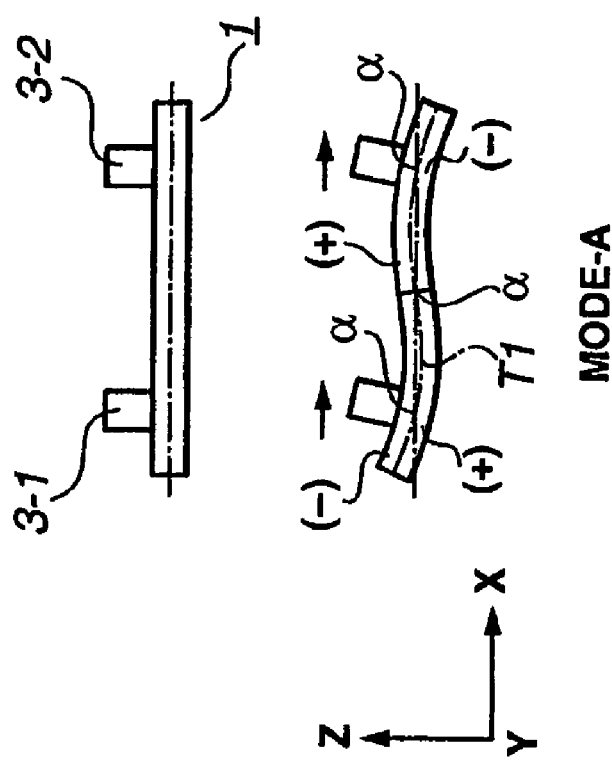

FIGS. 2A and 2B show the shapes of the vibration element 1 occurring in two vibration modes (MODE-A and MODE-B). Each vibration mode is a flexural vibration mode in which the plate-like vibration element 1 is flexed in an out-of-plane direction. These two modes (MODE-A and MODE-B) will be described with reference to the X, Y and Z coordinate system.

The shape of the vibration element 1 is determined in advance so as to make the resonance frequencies in the two vibration modes approximately coincide with each other. The resonance frequency of the vibration element 1 shown in FIGS. 2A and 2B is about 80 kHz. FIG. 2A is a view of the vibration element 1 as seen from the Y direction. When the vibration element 1 is excited in MODE-A, nodes (α) of vibration appear at three points or lines (secondary flexural vibration mode) as shown in the lower half of FIG. 2A. These nodes extend in the Y direction of the vibration element 1.

In MODE-A, when the vibration element 1 is seen from the X direction, no nodes of vibration appear. The protruding portions 3-1 and 3-2 are disposed at or in the vicinity of positions where nodes occur in the vibration in MODE-A, as shown in FIG. 2A. Accordingly, the vibration in MODE-A causes the contact portions 4-1 and 4-2 to make a reciprocating motion in the X direction as indicated by arrows in FIG. 2A.

Thus, since the protruding portions 3-1 and 3-2 are disposed at or in the vicinity of positions of nodes in MODE-A, the protruding portions 3-1 and 3-2 can be displaced to the greatest extent in the X direction.

FIG. 2B is a view of the vibration element 1 as seen from the X direction. When the vibration element 1 is excited in MODE-B, nodes (β) of vibration appear at two points or lines (primary flexural vibration mode) as shown in the lower half of FIG. 2B. These nodes extend in the X direction of the vibration element 1. In other words, a group of nodes of the vibration in MODE-A and a group of nodes of the vibration in MODE-B are not in parallel with each other and are, instead, perpendicular to each other within the X-Y plane. In MODE-B, when the vibration element 1 is seen from the Y direction, no nodes of vibration appear.

The protruding portions 3-1 and 3-2 are disposed at or in the vicinity of positions where antinodes occur in the vibration in MODE-B, as shown in FIG. 2B. Accordingly, the vibration in MODE-B causes the contact portions 4-1 and 4-2 to make a reciprocating motion in the Z direction as indicated by arrows in FIG. 2B.

Thus, since the protruding portions 3-1 and 3-2 are disposed at or in the vicinity of positions of antinodes in MODE-B, the protruding portions 3-1 and 3-2 can be displaced to the greatest extent in the Z direction. As mentioned above, the protruding portions 3-1 and 3-2 are displaced to a great degree in both the X direction and the Z direction, so that it is possible to exert a large driving force on the linear slider 6.

When an intended driving signal is supplied to the multi-layer piezoelectric element 5, the above-described vibration modes (MODE-A and MODE-B) are caused in the vibration element 1 owing to inverse piezoelectric effect. Then, vibrations are excited in such a manner that the phase difference between vibrations in MODE-A and MODE-B becomes 90° or approximately 90°, so that an elliptical movement within the X-Z plane shown in FIG. 1A is generated at the contact portions 4-1 and 4-2. Accordingly, the linear slider 6 is moved in the X direction so that it is pushed by the contact portions 4-1 and 4-2 where the elliptical movement is generated.

Here, strains that take place in the vibration element 1 when the above-described vibration modes (MODE-A and MODE-B) are caused will be described.

First, in the case of MODE-A, characters (+) and (−) shown in FIGS. 2A and 2B represent the signs of strain components in the X direction that take place when deformation is caused by vibrations in the vibration element 1. The character (+) indicates that the multi-layer piezoelectric element 5 has expanded in the X direction, and the character (−) indicates that the multi-layer piezoelectric element 5 has contracted in the X direction.

With the characters (+) and (−) taken into consideration, the multi-layer piezoelectric element 5 is divided into two regions in the thickness direction (Z direction) with the boundary formed by a neutral plane T1 where no strains in the X direction take place. Further, the signs of the characters (+) and (−) reverse across the vicinity of the center of the multi-layer piezoelectric element 5 in the X direction (see FIG. 2A).

In the case of MODE-B, if the signs of strain components in the Y direction that take place in the multi-layer piezoelectric element 5 are taken into consideration, the multi-layer piezoelectric element 5 is divided into two regions in the thickness direction (Z direction) with the boundary formed by a neutral plane T2 where no strains in the Y direction take place (see FIG. 2B).

Figure 3A:
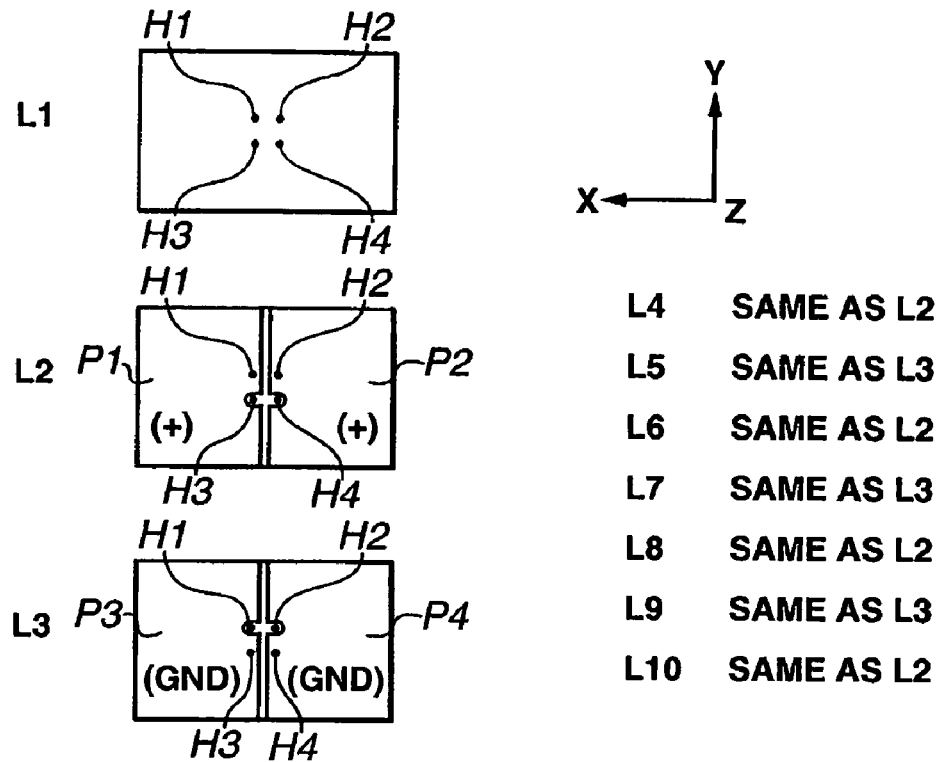
FIGS. 3A and 3B are diagrams showing the structural arrangement of a multi-layer piezoelectric element of the first embodiment.

FIG. 3A is a schematic diagram showing the layered structure of the multi-layer piezoelectric element 5. The multi-layer piezoelectric element 5 employed in the first embodiment is formed with an exemplary number of ten piezoelectric element films L (L1 to L10) joined one upon another.

Since an exemplary thickness of each piezoelectric element film is about 0.06 mm, the thickness of the multi-layer piezoelectric element 5 is about 0.6 mm. On the front surface of each of the piezoelectric element films L2 to L10, there are formed electrode films P1 to P4 as shown in FIG. 3A. Also, there are formed via-hole electrodes H1 to H4 piercing the piezoelectric element films to make conduction with electrode films formed on the upper and lower layers.

On each of the even-numbered piezoelectric element films L2, L4, L6, L8 and L10 among the piezoelectric element films L2 to L10, there are formed two electrode films P1 and P2, which are approximately symmetric in the X direction in FIG. 3A. Similarly, on each of the odd-numbered piezoelectric element films L3, L5, L7 and L9 among the piezoelectric element films L3 to L9, there are formed two electrode films P3 and P4, which are approximately symmetric in the X direction in FIG. 3A.

The electrode film P1 is electrically connected to the via-hole electrode H1. Similarly, the electrode film P2 is electrically connected to the via-hole electrode H2, the electrode film P3 to the via-hole electrode H3, and the electrode film P4 to the via-hole electrode H4. On the piezoelectric element film L1 forming the front surface of the multi-layer piezoelectric element 5, there are formed four via-hole electrodes H1 to H4. The via-hole electrodes H1 to H4 function to make conduction with the electrode films formed on the piezoelectric element film L2 and subsequent piezoelectric element films as well as external terminals.

Characters (+) and (GND) shown in FIG. 3A represent electric potentials appearing at the time of polarization. For example, the region of the electrode film P1 of the piezoelectric element film L2 is made to polarize in the thickness direction (Z direction) by the potential between the electrode film P1 and the electrode film P3 formed on the piezoelectric element film L3. Also, the region of the electrode film P2 of the piezoelectric element film L2 is polarized in the thickness direction (Z direction) using the potential between the electrode film P2 and the electrode film P4 formed on the piezoelectric element film L3. Similarly, each of the piezoelectric element films L3 to L9 is polarized in the thickness direction (Z direction) by the potential between the associated electrode films.

Figure 3B:
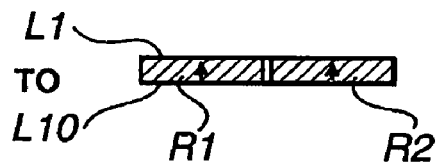

In FIG. 3B, there is schematically shown the polarized state of the multi-layer piezoelectric element 5 corresponding to the situation when a potential is applied to the via-hole electrode H1 with the via-hole electrode H3 exposed on the front surface of the multi-layer piezoelectric element 5 as a common potential and when a potential is applied to the via-hole electrode H2 with the via-hole electrode H4 as a common potential. Thus, as shown in FIGS. 3A and 3B, the multi-layer piezoelectric element 5 is divided into two regions that are approximately symmetric in the X direction. Also, correspondingly with the two regions, the multi-layer piezoelectric element 5 has areas R1 and R2 that are polarized in the same direction when seen in the thickness direction (Z direction).

Figure 4:
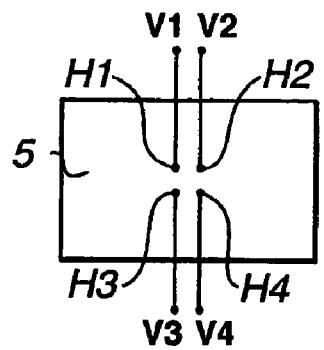
FIG. 4 is a diagram showing the electrical connection state of the vibration element of the first embodiment.

FIG. 4 shows the bottom surface of the vibration element 1. This bottom surface includes the front surface of the multi-layer piezoelectric element 5, which has terminal electrodes H1 to H4. The terminal electrodes H1 to H4 serve also as via-hole electrodes that are formed on the piezoelectric element film L1.

In FIG. 4, a potential V1 is applied to the terminal electrode H1. Similarly, a potential V2 to the terminal electrode H2, a potential V3 to the terminal electrode H3, and a potential V4 to the terminal electrode H4. It is now assumed that the difference between the potential V1 and the potential V3 is a potential difference E1 and the difference between the potential V2 and the potential V4 is a potential difference E2. Here, the individual potentials V1 to V4 are determined in such a way that the potential differences E1 and E2 become alternating signals in the vicinity of resonance frequencies in MODE-A and MODE-B. Moreover, the individual potentials V1 to V4 are determined in such a way that the levels of signals of the potential differences E1 and E2 become the same.

While the areas R1 and R2 are polarized in the same direction, they may be polarized in opposite directions so as to make it possible to perform the driving of the ultrasonic actuator with the same construction as that described above.

Further, while, in the first embodiment, a single multi-layer piezoelectric element 5 is used as a piezoelectric element of the vibration element 1, a plurality of piezoelectric elements may be used to obtain the same function as that of the multi-layer piezoelectric element 5. In addition, the areas R1 and R2 may be formed with the respective individual multi-layer piezoelectric elements.

In summary, in the ultrasonic actuator according to the first embodiment, two flexural vibration modes (MODE-A and MODE-B) in which the direction of generation of a node in MODE-A is approximately perpendicular to that in MODE-B and in which the respective frequencies are approximately coincident with each other are combined to generate an elliptical movement at the protruding portions 3-1 and 3-2 (the contact portions 4-1 and 4-2).

With the two flexural vibration modes, the size of the vibration element can be reduced without increasing the driving frequency. Then, with the reduction in size of the vibration element, the size of the ultrasonic actuator can be reduced.

On the other hand, the multi-layer piezoelectric element 5, which is composed of a plurality of piezoelectric element films, is used as a piezoelectric element for exciting vibrations in the vibration element, so that the construction of the piezoelectric element that is suitable for the vibration excitation in vibration element can be realized. The driving signal level can also be kept low as compared with the case where a single piezoelectric element is used.

Further, the multi-layer piezoelectric element 5 is divided into two regions that are approximately symmetric in a predetermined direction (the X direction), and the two regions are made to function for excitation in two vibration modes, so that the multi-layer piezoelectric element can have a simple construction. As a result, the whole region of the piezoelectric element can participate in driving the driven element, and any region of the piezoelectric element that is not involved in driving the driven element is eliminated, so that a sufficient output power can be obtained despite the small-sized vibration element being used.

In other words, even when the vibration element is reduced in size, a sufficient output power to drive the driven element can be obtained, and a vibration element that excels in output characteristic can be realized. On the other hand, if the vibration element is kept in an ordinary size, the vibration element can produce a larger output power.

Thus, even in an ultrasonic actuator serving as a vibration-type driving device that uses the above-described vibration element, a larger output power can be obtained regardless of size.

It should be noted that the construction of the vibration element is not limited to that of the vibration element 1 as described in the first embodiment. For example, such an ultrasonic actuator 10 as shown in FIG. 5 is attainable.

Figure 5:
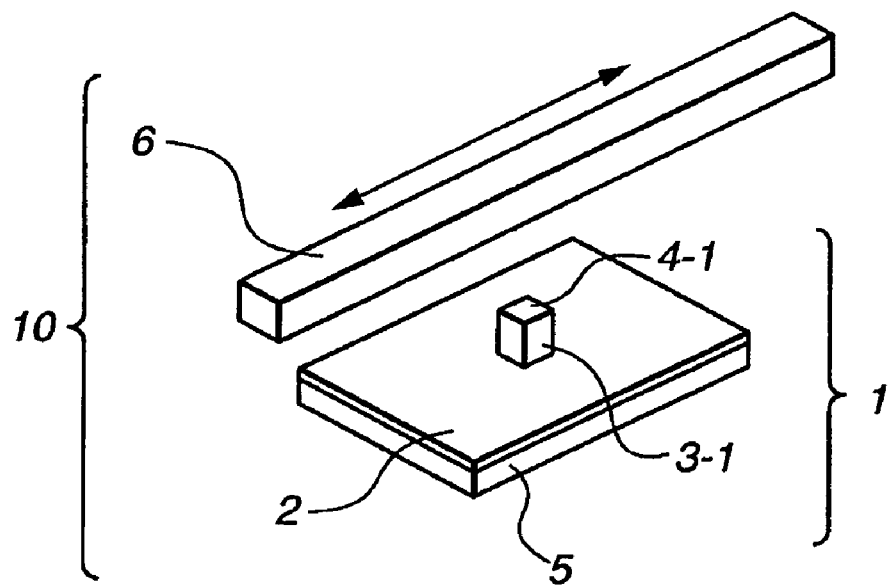
FIG. 5 is a perspective view showing an alternative form of vibration element of the first embodiment.

In FIG. 5, in an approximately central position on the top surface of the vibration element 1, there is formed one protruding portion 3-1. Also, on the tip of the protruding portion 3-1, there is formed a contact portion 4-1, which is kept in contact with the linear slider 6. The other structural arrangement is similar to that described in the first embodiment (FIG. 1A).

Figure 6A:
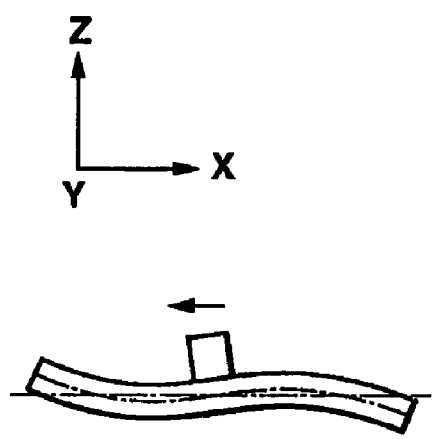
FIGS. 6A and 6B are diagrams illustrating vibration modes of the alternative form of vibration element of the first embodiment.
Figure 6B:
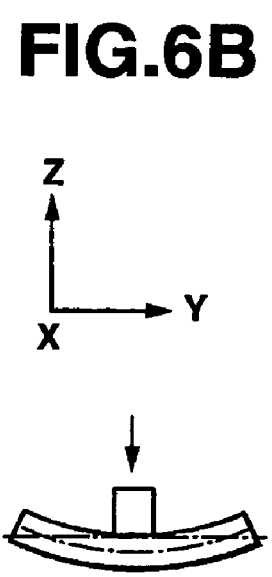

With the vibration modes (MODE-A and MODE-B) and the multi-layer piezoelectric element 5 used, states of vibration as shown in FIGS. 6A and 6B are obtained. A position where the protruding portion 3-1 is formed is the position of a node in MODE-A as well as the position of an antinode in MODE-B. Accordingly, at the contact portion 4-1 of the protruding portion 3-1, a reciprocating motion in the X direction as indicated by arrows in FIG. 6A is generated by the vibration in MODE-A. Also, at the contact portion 4-1, a reciprocating motion in the Z direction as indicated by arrows in FIG. 6B is generated by the vibration in MODE-B.

The thus-generated motions in the Z direction and Y direction cause the contact portion 4-1 to make an elliptical movement, thereby causing the linear slider 6 and the vibration element 1 to move relative to each other.

Since, as shown in FIG. 5, a single protruding portion 3-1 is formed on the vibration element 1, it is viable to shorten (reduce in size) the linear slider 6, which is kept in contact with the protruding portion 3-1. Then, with the linear slider 6 reduced in size, it is viable to further reduce the size of the ultrasonic actuator 10.

In the first embodiment, MODE-A is made to be an out-of-plane secondary flexural vibration mode, and MODE-B is made to be an out-of-plane primary flexural vibration mode.

The driving plate 2 of the vibration element 1, which is rectangular in shape, is approximately symmetric with respect to a plane passing through the center of the driving plate 2 and extending in the X direction or the Y direction (see FIG. 1A). Accordingly, the anode and antinode in MODE-A and MODE-B are generated at positions that are symmetric with respect to the above-mentioned plane in the vibration element 1, as shown in FIGS. 2A and 2B.

Consequently, two protruding portions 3-1 and 3-2 can be formed at approximately symmetric positions on the vibration element 1, as shown in FIG. 1A. Also, a single protruding portion 3-1 can be formed in the vicinity of the central position of the vibration element 1, as shown in FIG. 5. Even so, the single protruding portion 3-1 becomes symmetric with respect to the above-mentioned plane.

With the protruding portions 3-1 and 3-2 disposed as described above, the vibration element 1 can impartially receive a reaction force from the linear slider 6 at the protruding portions 3-1 and 3-2. Further, since the positional relationship between the linear slider 6 and the contact portions 4-1 and 4-2 becomes stable, it is possible to realize a vibration-type driving device capable of generating a stable output power without being influenced by environmental or other such changes.

Moreover, in the first embodiment as described above, the linear slider 6 for linear motion is employed as a driven element in the ultrasonic actuator 10. However, the driven element according to the invention should not be limited the linear slider 6. More specifically, a member formed in the shape of cylinder, disc, ellipse or the like may be employed as the driven element, and such a member may be caused to make a rotary movement.

Figure 7A:
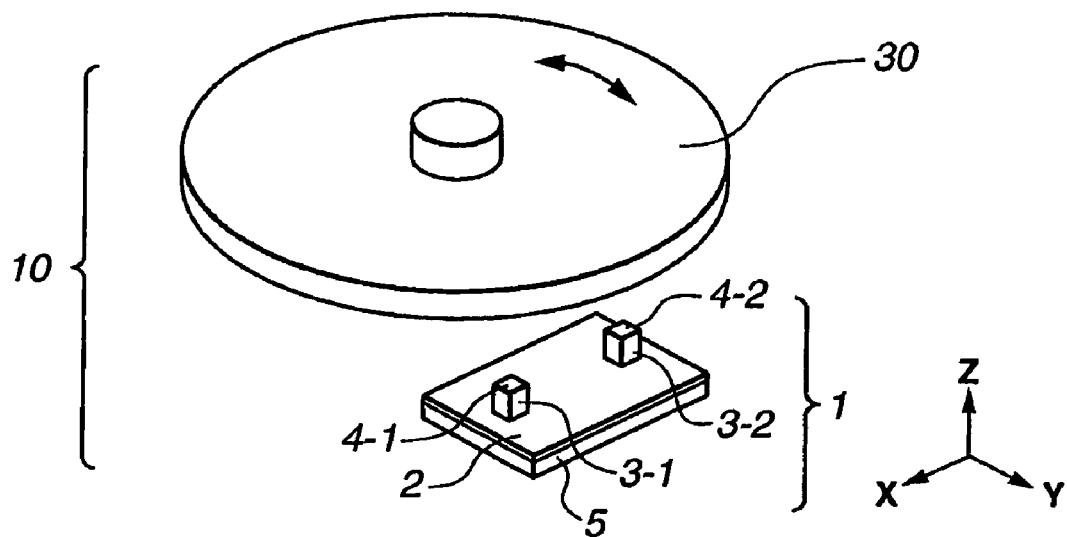
FIGS. 7A and 7B are diagrams showing examples of modification of the first embodiment.
Figure 7B:
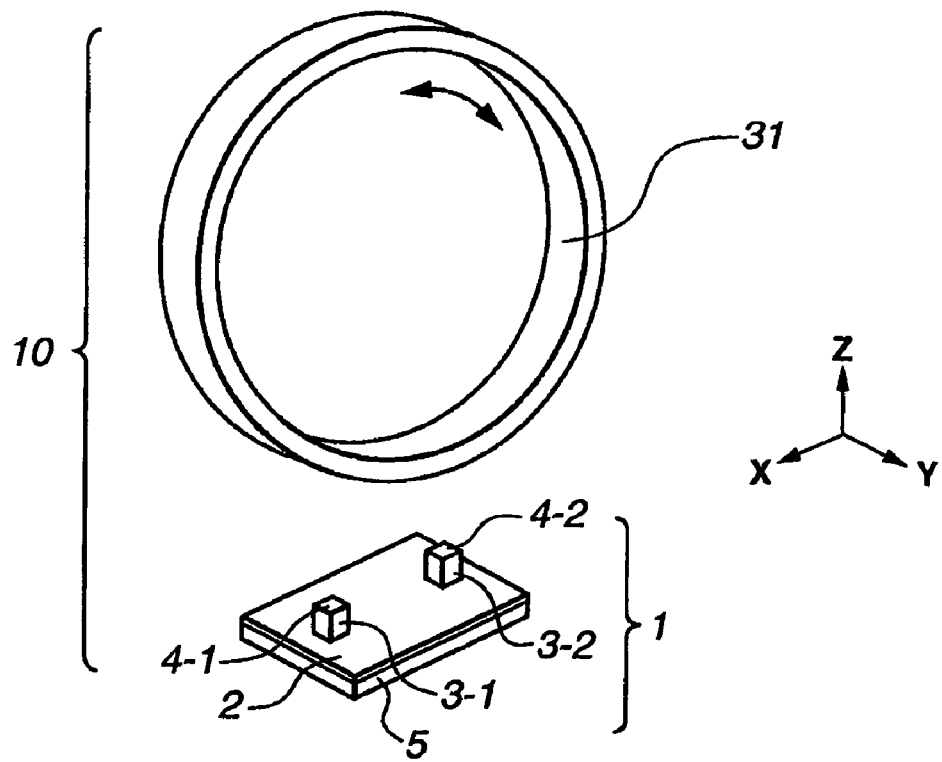

The structural arrangement of an ultrasonic actuator 10 for producing such a rotary movement is shown in FIGS. 7A and 7B. In FIGS. 7A and 7B, a vibration element 1 similar to that of the first embodiment is employed, and a disc-shaped rotor 30 (see FIG. 7A) or a ring-shaped rotor 31 (see FIG. 7B) is brought into contact with the vibration element 1 so as to complete the ultrasonic actuator 10.

With the structural arrangement of the ultrasonic actuator 10 as described above, the rotor 30 or 31 makes a rotary movement in directions indicated by arrows shown in FIGS. 7A and 7B.

(Second Embodiment)

Figure 8:
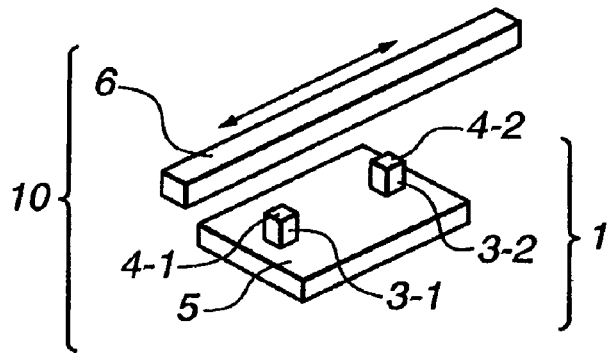
FIG. 8 is a perspective view showing a vibration-type driving device according to a second embodiment of the invention.

FIG. 8 is a perspective view showing the appearance of a linear-type ultrasonic actuator 10 serving as a vibration-type driving device according to a second embodiment of the invention.

In FIG. 8, the vibration element 1 is composed of a multi-layer piezoelectric element 5 formed into a rectangular thin-plate shape, and two protruding portions 3-1 and 3-2 formed integrally with the multi-layer piezoelectric element 5 on the front surface thereof. On the tip surfaces of the protruding portions 3-1 and 3-2, there are formed contact portions 4-1 and 4-2, which are kept in contact with a linear slider 6 serving as a driven element.

Thus, while, in the first embodiment, the multi-layer piezoelectric element 5, the driving plate 2 and the protruding portions 3-1 and 3-2 constitute the vibration element 1, the multi-layer piezoelectric element 5 and the protruding portions 3-1 and 3-2 constitute the vibration element 1 in the second embodiment.

The protruding portions 3-1 and 3-2 are required to have properties that excel in friction factor or abrasion resistance, and, in the second embodiment, alumina is used as the material of the protruding portions 3-1 and 3-2. Two vibration modes (MODE-A and MODE-B) to be caused in the vibration element 1 in the second embodiment are the same as those described in the first embodiment (see FIGS. 2A and 2B).

Figure 9A:
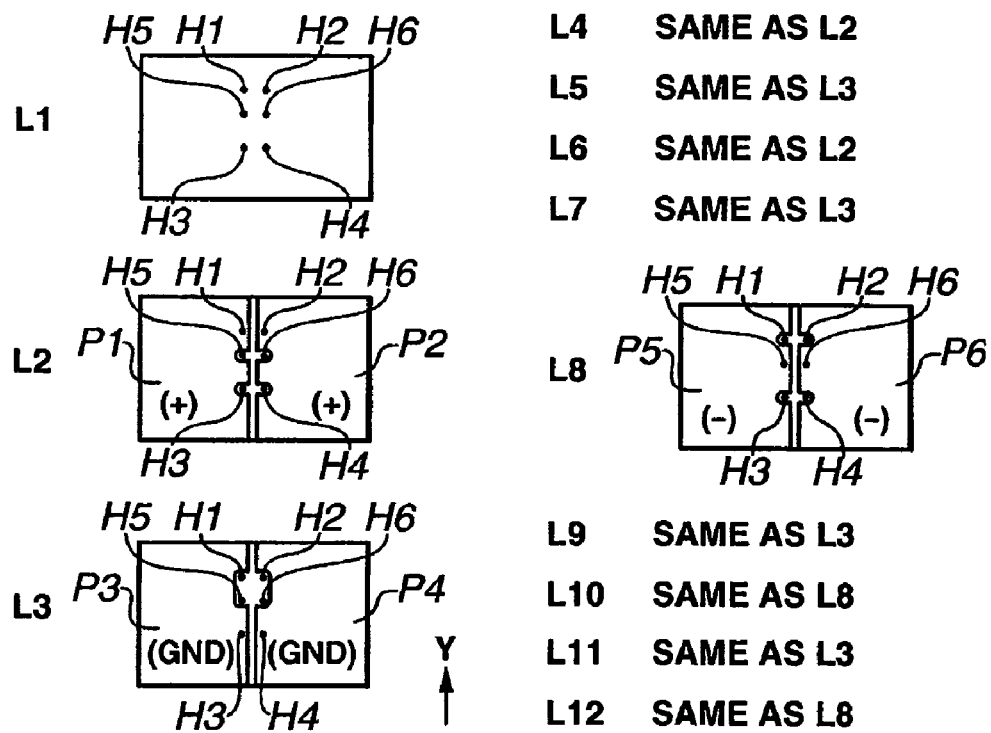
FIGS. 9A and 9B are diagrams showing the structural arrangement of a multi-layer piezoelectric element of the second embodiment.
Figure 9B:
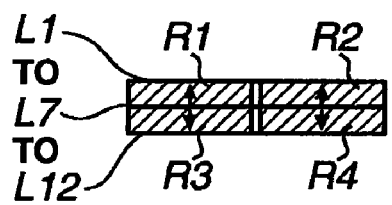

FIGS. 9A and 9B are schematic diagrams showing the layered structure of the multi-layer piezoelectric element 5 in the second embodiment. The multi-layer piezoelectric element 5 is formed with an exemplary number of twelve piezoelectric element films L (L1 to L12) joined one upon another. Since the thickness (exemplary) of each piezoelectric element film is about 0.06 mm, the thickness of the multi-layer piezoelectric element 5 is about 0.72 mm.

In FIG. 9A, on the front surfaces of the piezoelectric element films L2 to L12, there are formed electrode films P1 to P6, which are divided into two groups that are approximately symmetric in the X direction. On each of the piezoelectric element films L2, L4 and L6, there are formed electrode films P1 and P2, and on each of the piezoelectric element films L8, L10 and L12, there are formed electrode films P5 and P6. On the odd-numbered piezoelectric element films L3, L5, L7, 19 and L11 among the piezoelectric element films L3 to L11, there are formed electrode films P3 and P4.

The electrode films P1 to P6 are electrically connected to via-hole electrodes H1 to H6, respectively. More specifically, the electrode film P1 is electrically connected to the via-hole electrode H1, the electrode film P2 to the via-hole electrode H2, the electrode film P3 to the via-hole electrode H3, the electrode film P4 to the via-hole electrode H4, the electrode film P5 to the via-hole electrode H5, and the electrode film P6 to the via-hole electrode H6.

Via-hole electrodes H1 to H6 that are formed on the piezoelectric element film L1 serve as terminal electrodes that are used to conduct electrical connection between the multi-layer piezoelectric element 5 and the outside. When the terminal electrodes H1 and H2 are given a positive potential, the terminal electrodes H3 and H4 are given a negative potential, and the terminal electrodes H5 and H6 are given a common potential, such polarization as indicated by characters (+), (−) and (GND) in FIG. 9A is caused.

FIG. 9B schematically shows the directions of polarization inside the multi-layer piezoelectric element 5. As shown in FIG. 9B, areas R1 and R2 are formed in the range of the piezoelectric element films L2 to L6, and areas R3 and R4 are formed in the range of the piezoelectric element films L7 to L11.

The action of the multi-layer piezoelectric element 5, which is part of the vibration element 1 is as follows.

The areas R1 and R2 of the multi-layer piezoelectric element 5 are located above the neutral planes T1 and T2 shown in FIGS. 2A and 2B, and the areas R3 and R4 are located below the neutral planes T1 and T2.

Figure 10:
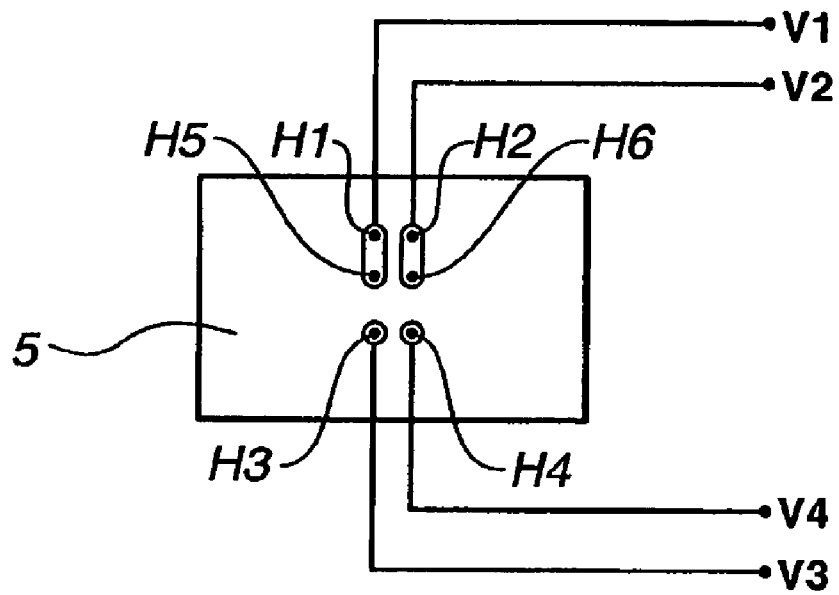
FIG. 10 is a diagram showing the electrical connection state of the vibration element of the second embodiment.

As shown in FIG. 10, electrical potentials V1 to V4 are applied to the terminal electrodes H1 to H6, which are formed on the front surface of the multi-layer piezoelectric element 5. More specifically, the potential V1 is applied to the terminal electrodes H1 and H5. The potential V3 is applied to the terminal electrode H3. It is now assumed that the potential difference between the potentials V1 and V3 is a potential difference E1.

When potentials having the potential difference E1 are applied to the multi-layer piezoelectric element 5, the areas R1 and R3 have properties in opposite directions with respect to polarization and potential difference, for example, a strain for expansion is generated in the area R1 and, at the same time, a strain for contraction is generated in the area R3. In other words, the multi-layer piezoelectric element 5 functions like a bimorph with the areas R1 and R3 paired.

On the other hand, the potential V2 is applied to the terminal electrodes H2 and H6, and the potential V4 is applied to the terminal electrode H4. It is now assumed that the potential difference between the potentials V2 and V4 is a potential difference E2.

When potentials having the potential difference E2 are applied to the multi-layer piezoelectric element 5, for example, a strain for expansion is generated in the area R2 and, at the same time, a strain for contraction is generated in the area R4. In other words, the multi-layer piezoelectric element 5 functions like a bimorph with the areas R2 and R4 paired.

In the vibration element 1 that uses the multi-layer piezoelectric element 5 having the above-described structural arrangement, vibrations are made to be generated in almost the whole region of portions that constitute the vibration element 1.

According to the second embodiment, the use of the multi-layer piezoelectric element 5 makes it viable to obtain a sufficient output power despite the voltage level of the driving signal being low as compared with the case where a single piezoelectric element is used, and also makes it viable to realize a small-sized and high-power vibration-type driving device.

(Third Embodiment)

Figure 11:
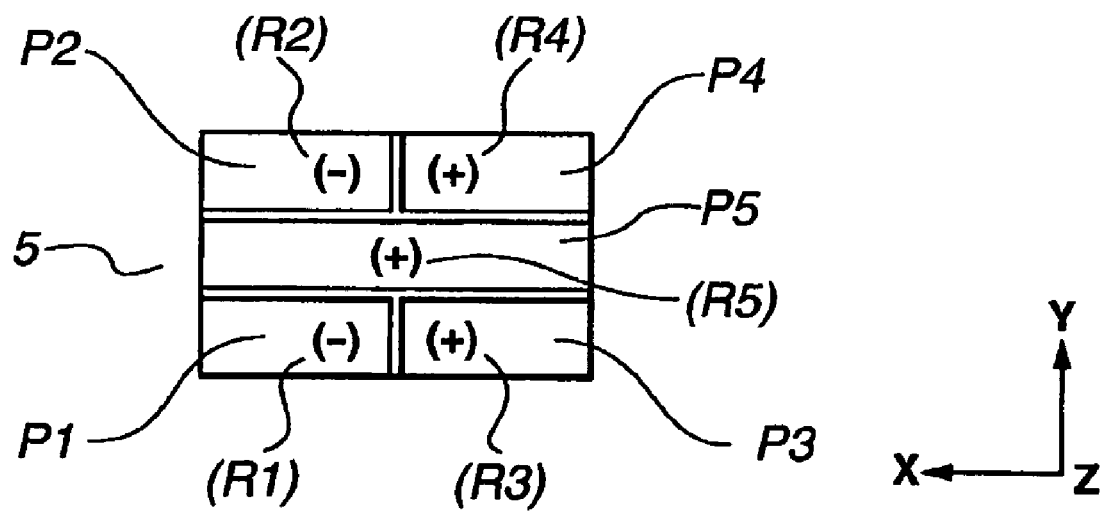
FIG. 11 is a diagram showing the structural arrangement of a piezoelectric element of a third embodiment of the invention.

FIG. 11 shows the structural arrangement of a piezoelectric element 5 in a linear-type ultrasonic actuator serving as a vibration-type driving device according to a third embodiment of the invention. In the third embodiment, the driving plate 2, the protruding portions 3-1 and 3-2 and the ultrasonic actuator 10 are the same in construction as those described in the first embodiment (FIG. 1A), but the construction of a piezoelectric element in the ultrasonic actuator 10 is different from that described in the first embodiment.

As shown in FIG. 11, on one end surface of the piezoelectric element 5, there are formed five electrode films P1 to P5, which are arranged to be approximately symmetric both in the X direction and the Y direction. The electrode films P1 and P2 as well as the electrode films P3 and P4 are arranged to be approximately symmetric with respect to the X-axis passing through the center of the piezoelectric element 5.

Also, the electrode films P1 and P3 as well as the electrode films P2 and P4 are arranged to be approximately symmetric with respect to the Y-axis passing through the center of the piezoelectric element 5.

Further, on a region passing through the vicinity of the center of the piezoelectric element 5 and extending in the X direction, there is formed an electrode film P5. It is now assumed that, in the piezoelectric element 5, parts surrounded with the electrode films P1 to P5 as mentioned above and the common electrode formed on the back side of the piezoelectric element 5 (i.e., areas extending in the Z direction from the electrode films P1 to P5) are areas R1 to R5, respectively.

In the areas R1 to R5, polarization is caused as indicated by characters (+) and (−) in FIG. 11. With the above-mentioned piezoelectric element 5 incorporated in the vibration element 1, when a common driving signal is supplied to the electrode films P1 to P4, strains in opposite directions are generated in the areas R1, R2 and the areas R3, R4.

Then, such deformation of the piezoelectric element 5 causes vibrations thereof in MODE-A as described in the first embodiment. When another driving signal is supplied to the electrode film P5, the vibration in MODE-B as described in the first embodiment is caused.

In each of the areas R1 to R5, for example, the width thereof in the Y direction can be arbitrarily determined in accordance with design. With such determination, an output power to be generated in two vibration modes (MODE-A and MODE-B) can be determined, so that the shape of an elliptical movement to be generated in the vibration element 1 is controllable. As a result, it is possible to realize an ultrasonic actuator that excels in efficiency of driving.

Figure 12:
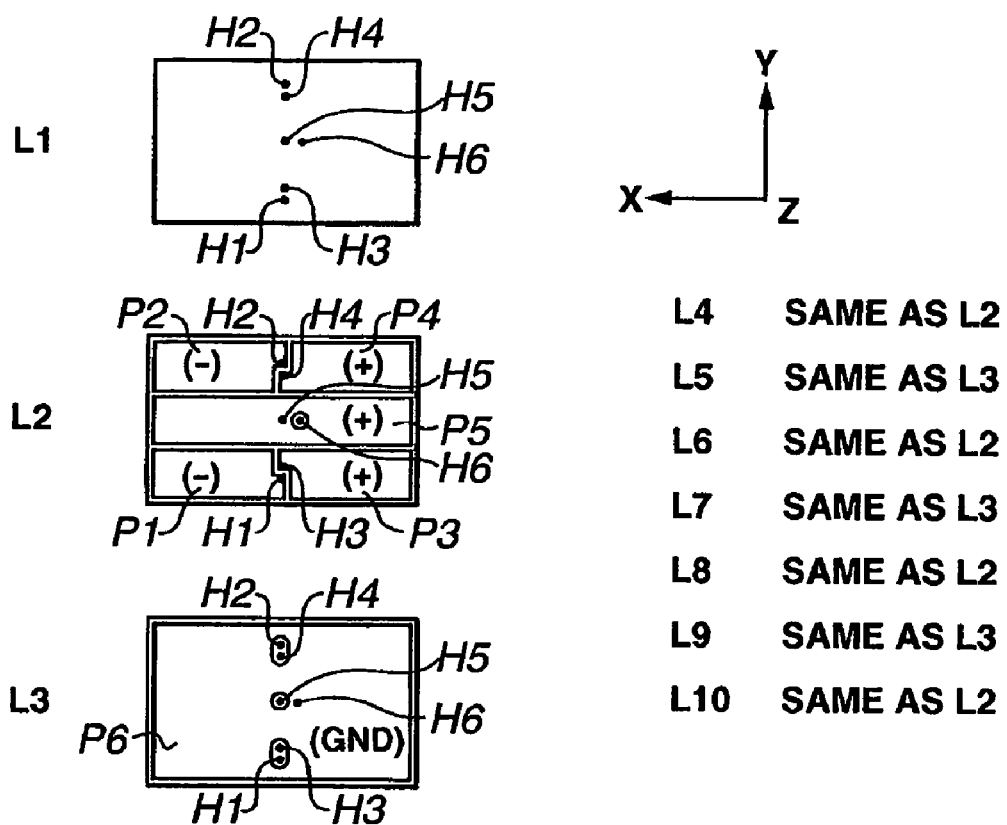
FIG. 12 is a diagram showing a multi-layer piezoelectric element as an alternative form of piezoelectric element of the third embodiment.

In the third embodiment, a multi-layer piezoelectric element may be used as the piezoelectric element 5. Such a modification of the third embodiment is described with reference to FIG. 12, which shows the construction of the multi-layer piezoelectric element 5. Here, the construction using piezoelectric element films, electrode films and via-hole electrodes is the same as that described in the preceding embodiments, and, therefore, the detailed description thereof is omitted.

The multi-layer piezoelectric element 5 is composed of ten layers of electrode films, i.e., piezoelectric element films L1 to L10. On each of the even-numbered piezoelectric element films L2, L4, L6, L8 and L10 among the piezoelectric element films L2 to L10, there are formed five electrode films P1 to P5. Also, on each of the odd-numbered piezoelectric element films L3, L5, L7 and L9 among the piezoelectric element films L3 to L9, there is formed one electrode film P6, which covers almost the whole surface of each piezoelectric element film.

Each piezoelectric element film is surrounded by the electrode films P1 to P5 and the electrode film P6, and portions corresponding to the associated electrode films function as individual driving areas. It is now assumed that such areas corresponding to the electrode films P1 to P5 are areas R1 to R5, respectively. These areas R1 to R5 are arranged in the same way as in the piezoelectric element shown in FIG. 11.

When a potential is applied to the areas R1 to R4, the vibration in MODE-A as described in the first embodiment is excited, and, when a potential is applied to the area R5, the vibration in MODE-B as described in the first embodiment is excited.

Figure 13:
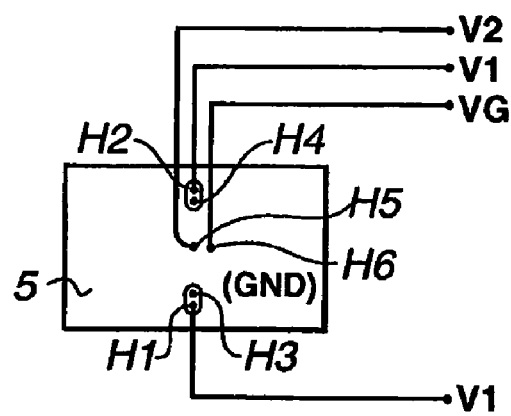
FIG. 13 is a diagram showing the electrical connection state of the multi-layer piezoelectric element as the alternative form of piezoelectric element of the third embodiment.

The electrical conduction between the multi-layer piezoelectric element 5 in the modification of the third embodiment and the outside is effected in such a manner as shown schematically in FIG. 13. More specifically, a potential V1 is applied to the terminal electrodes H1 to H4, a potential V2 is applied to the terminal electrode H5, and a potential VG is applied to the terminal electrode H6. The terminal electrodes H1 to H6 function also as via-hole electrodes H1 to H6, respectively, formed on the piezoelectric element films L1 to L10.

Thus, the areas R1 to R4 are given a potential difference E1 between the potential V1 and the potential VG, and the area R5 is given a potential difference E2 between the potential V2 and the potential VG. With the multi-layer piezoelectric element 5 and the driving signals arranged as described above, the vibration in MODE-A is excited by the areas R1 to R4, and the vibration in MODE-B is excited by the area R5, in the same way as described with reference to FIG. 11.

(Fourth Embodiment)

Figure 14A:
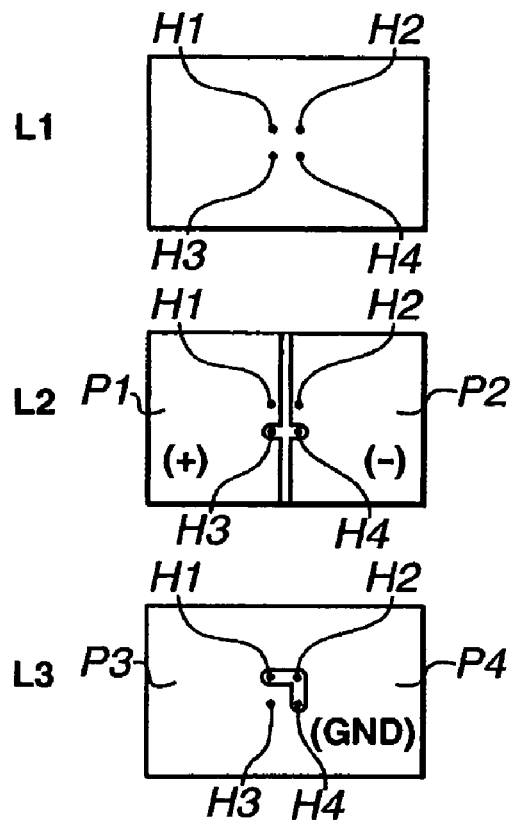
FIGS. 14A and 14B are diagrams showing the structural arrangement of a multi-layer piezoelectric element of a fourth embodiment of the invention.
Figure 14A:
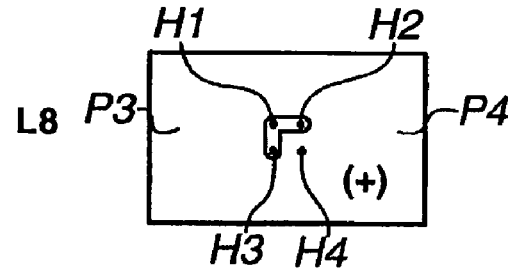
Figure 14B:
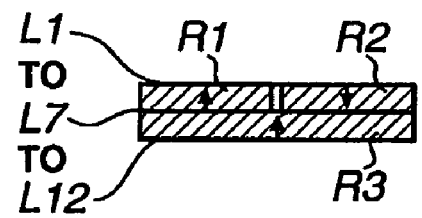

FIGS. 14A and 14B show the structural arrangement of a multi-layer piezoelectric element 5 in a linear-type ultrasonic actuator serving as a vibration-type driving device according to a fourth embodiment of the invention. Here, the vibration element 1 and the ultrasonic actuator 10 are the same in construction as those described in the second embodiment (FIG. 8), and, therefore, the detailed description thereof is omitted.

The multi-layer piezoelectric element 5 in the fourth embodiment is composed of twelve piezoelectric element films L1 to L12, as shown in FIG. 14A. On the piezoelectric element films L1 to L12, there are formed electrode films P1 to P4 and via-hole electrodes H1 to H4, in the same way as described in the preceding embodiments.

The electrode films P1 and P2 formed on each of the piezoelectric element films L2, L4 and L6 and the electrode film P3 formed on each of the piezoelectric element films L3, L5 and L7 make the piezoelectric element films L2 to L6 have areas R1 and R2, as shown in FIG. 14B. Such areas R1 and R2 function only as those for exciting the vibration in MODE-A.

Also, the electrode film P4 formed on each of the piezoelectric element films L8, L10 and L12 and the electrode film P3 formed on each of the piezoelectric element films L7, L9 and L11 make the piezoelectric element films L7 to L11 have an area R3, as shown in FIG. 14B.

The potential states of the electrode films P1 to P4 obtained when, with the via-hole electrode H3 set as a common potential, a positive potential is applied to the via-hole electrodes H1 and H4 and a negative potential is applied to the via-hole electrode H2 are represented by characters (+), (−) and (GND) shown in FIG. 14A. Such a state as polarized in the above-described manner is schematically indicated by arrows in FIG. 14B. As shown in FIG. 14B, the areas R1 and R2 are polarized in opposite directions.

When the multi-layer piezoelectric element 5 having the above-described construction is incorporated into the vibration element 1, the areas R1 and R2 are arranged not to include the neutral plane T1 shown in FIGS. 2A and 2B and are located on one side of the neutral plane T1. The area R3 is arranged not to include the neutral plane T2 and are located on one side of the neutral plane T2.

The vibration state obtained when the multi-layer piezoelectric element 5 in the fourth embodiment is incorporated into the vibration element 1 is described. As in the preceding embodiments, potentials V1 to V4 are applied to the terminal electrodes H1 to H4, respectively. The terminal electrodes H1 to H4 function also as via-hole electrodes H1 to H4, respectively, formed on each piezoelectric element film.

It is now assumed that the potential difference between the potentials V1 and V3 is E1, the potential difference between the potentials V2 and V3 is E2, and the potential difference between the potentials V4 and V3 is E3.

First, the excitation of the vibration in MODE-A (being the same as in the first embodiment) in the vibration element 1 is described. With the electrical conduction effected and the driving signals determined in such a manner that the potential difference E1 becomes equal to the potential difference E2, strains in opposite directions are caused at the areas R1 and R2, respectively. In this instance, an exciting force corresponding to the potential difference E3 is generated in the area R3, but the area R3 does not operate as an exciting force in MODE-A.

In other words, the vibration in MODE-A is excited with the areas R1 and R2 operating in a unimorph state as exciting forces.

Also, the vibration in MODE-B (being the same as in the first embodiment) is excited with the area R3 operating in a unimorph state as an exciting force.

According to the fourth embodiment, the whole of regions constituting the vibration element 1 can participate in generating a driving force onto a driven element (linear slider 6), so that an ultrasonic actuator having compatibility between reduction in size and increase in output power can be realized.

(Fifth Embodiment)

Figure 15:
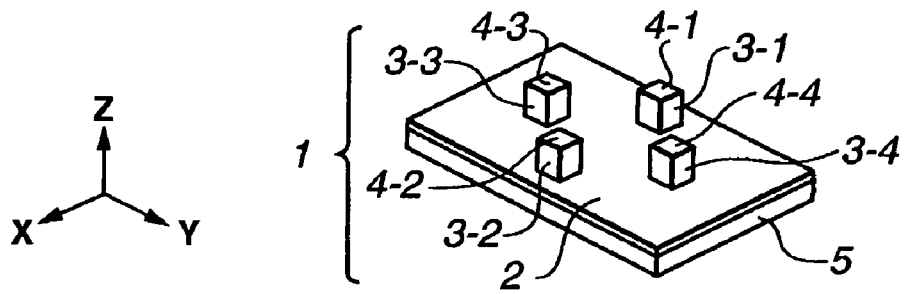
FIG. 15 is a perspective view showing a vibration element of a fifth embodiment of the invention.

FIG. 15 is a perspective view showing the appearance of a vibration element 1 in a linear-type ultrasonic actuator serving as a vibration-type driving device according to a fifth embodiment of the invention. In FIG. 15, the vibration element 1 is constructed with a thin plate formed into an approximately rectangular shape. On one end surface of the vibration element 1, there are disposed four protruding portions 3-1 to 3-4. Then, on the tips of the protruding portions 3-1 to 3-4, there are formed contact portions 4-1 to 4-4, respectively, which are kept in contact with a driven element (not shown).

Further, the vibration element 1 is composed of a piezoelectric element 5 formed into an approximately rectangular shape and a driving plate 2 on which the protruding portions 3-1 to 3-4 are formed integrally therewith. The vibration element 1 is arranged such that vibrations are excited in two flexural vibration modes (MODE-A and MODE-B), as shown in FIGS. 16A and 16B.

Figure 16A:
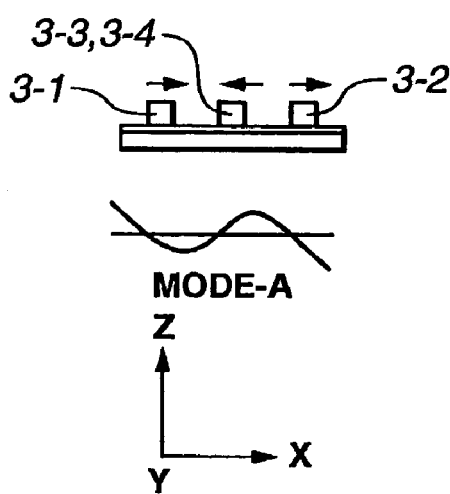
FIGS. 16A and 16B are diagrams illustrating vibration modes of a vibration element of the fifth embodiment.
Figure 16B:
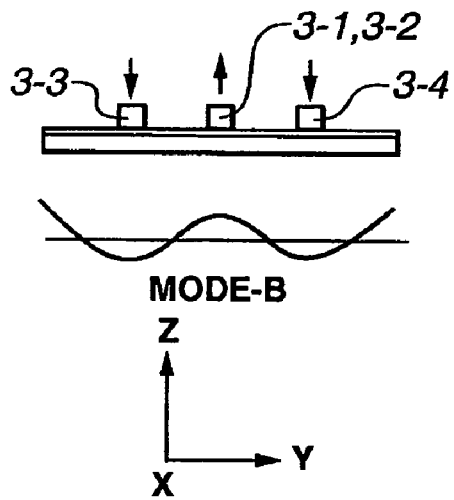

MODE-A is a secondary out-of-plane flexural vibration mode in which nodes are generated at three points along the X direction, as shown in FIG. 16A, and MODE-B is a tertiary out-of-plane flexural vibration mode in which nodes are generated at four points along the Y direction, as shown in FIG. 16B. Each of the protruding portions 3-1 to 3-4 is disposed in the vicinity of a position where a node in MODE-A is generated and an antinode in MODE-B is generated.

The vibration in MODE-A causes a reciprocating motion in the X direction to be generated at the protruding portions 3-1 to 3-4, and the vibration in MODE-B causes a reciprocating motion in the Z direction to be generated at the protruding portions 3-1 to 3-4. Then, vibrations in the two vibration modes (MODE-A and MODE-B) are excited in such a way as to make an adequate relation of phases thereof, so that an elliptical movement can be generated at the contact portions 4-1 to 4-4.

Here, since each of the protruding portions 3-1 to 3-4 is disposed, as mentioned above, in the position where a node in MODE-A is generated and an antinode in MODE-B is generated, the protruding portions 3-1 to 3-4 can be displaced to a large degree both in the X direction and the Z direction. Accordingly, a large driving force from the vibration element 1 can be exerted onto the driven element, so that a high-power vibration-type driving device can be attained.

Figure 17:
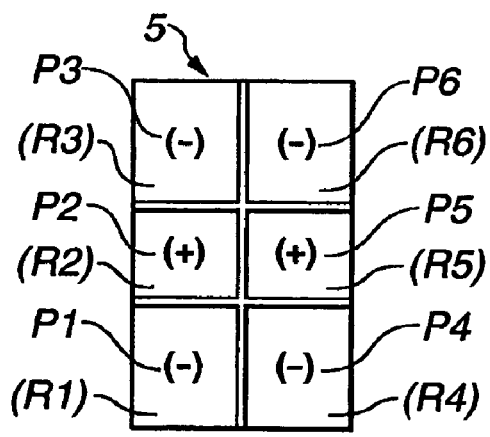
FIG. 17 is a diagram showing the structural arrangement of a piezoelectric element of the fifth embodiment.

FIG. 17 shows the arrangement of electrode films of the piezoelectric element 5 employed in the vibration element 1 according to the fifth embodiment. On one end surface of the piezoelectric element 5, there are formed six electrode films P1 to P6. In the piezoelectric element 5, areas R1 to R6 are formed corresponding to the electrode films P1 to P6, in the same way as described in the foregoing.

The areas R1 and R4 as well as the areas R2 and R5 and the areas R3 and R6 are so disposed as to be symmetric with respect to the Y-axis passing through the center of the piezoelectric element 5. Further, the areas R1 to R3 as well as the areas R4 to R6 are so disposed as to be aligned in the Y direction.

The areas R1 to R6 are polarized in the thickness direction of the piezoelectric element 5. In FIG. 17, characters (+) and (−) are used for indicating the individual polarized states of the areas R1 to R6.

The action of the vibration element 1 in which the above-mentioned piezoelectric element 5 is used is described.

First, a common driving signal V1 is supplied to the areas R1 to R3, and another common driving signal V2 is supplied to the areas R4 to R6.

When the driving signal V1 coincides with the driving signal V2 both in waveform and phase, the vibration in MODE-B is excited in the vibration element 1. Also, when the driving signal V1 coincides with the driving signal V2 in waveform but the driving signal V1 differs from the driving signal V2 in phase by 180 degrees or thereabout, the vibration in MODE-A is excited in the vibration element 1.

When the driving signal V1 coincides with the driving signal V2 in waveform but the driving signal V1 differs from the driving signal V2 in phase relatively by 90 degrees, the vibrations in MODE-A and MODE-B are excited in the vibration element 1 with the phase difference of 90 degrees maintained relatively.

As a result, elliptical movements in the same direction are generated at the contact portions 4-1 to 4-4. The loci of such elliptical movements are in the same shape at the contact portions 4-1 to 4-4, and the temporal phases of the elliptical movements become different from each other by 180 degrees between the contact portions 4-1, 4-2 and the contact portions 4-3, 4-4.

In the vibration-type driving device according to the fifth embodiment, a plurality of protruding portions 3-1 to 3-4 are disposed and a plurality of contact portions 4-1 to 4-4 are formed. Accordingly, the contact area between the driven element and the vibration element 1 can be increased as much as the increased number of protruding portions, so that the transmission of a driving force between the driven element and the vibration element 1 can be ensured more reliably.

(Sixth Embodiment)

In the above-described vibration element, there is required a piezoelectric element having respective dedicated electrodes for exciting vibrations in a plurality of vibration modes in the vibration element. Therefore, it is necessary to use a piezoelectric element having a complicated electrode pattern or to use a multi-layer piezoelectric element composed of a plurality of piezoelectric elements joined one upon another. Further, since directions of polarization differ with individual electrode patterns, the process of polarization becomes complicated.

In a sixth embodiment and subsequent embodiments of the invention, a further-improved vibration element in which an electro-mechanical energy conversion element is made to have a simplified electrode pattern is described.

Figure 18:
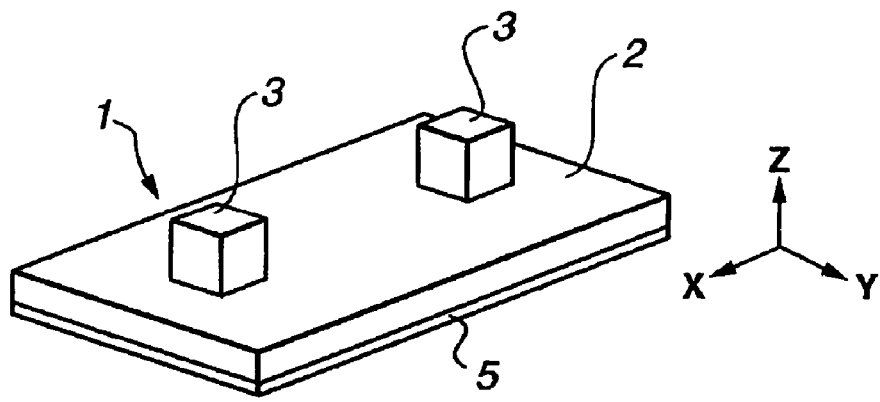
FIG. 18 is a perspective view showing a vibration element of a sixth embodiment of the invention.

FIG. 18 is a perspective view showing the appearance of a vibration element 1 in a linear-type ultrasonic actuator serving as a vibration-type driving device according to the sixth embodiment of the invention. In FIG. 18, there are shown a driving plate 2 composed of an elastic body made of metal and formed into a rectangular plate shape, a piezoelectric element (electro-mechanical energy conversion element) 5 bonded to the back side of the driving plate 2, and protruding portions 3 provided on the top surface of the driving plate 2.

The protruding portions 3 is arranged to be kept in contact with a driven element (an element to be driven), as is described later. Here, on each of the protruding portions 3, a contact portion that excels in friction factor or abrasion resistance may be provided. Further, the protruding portions 3 may be formed integrally with the driving plate 2 by means of press working or the like, or may be formed separately from the driving plate 2 and then fixed to the driving plate 2.

If the protruding portions 3 and the driving plate 2 are formed integrally, the number of steps of assembly work of the vibration element 1 can be reduced, and precision fluctuations in individual parts can be avoided because of positioning of parts (the protruding portions 3) being unnecessary.

In the vibration element 1 according to the sixth embodiment, vibrations in two flexural vibration modes can be excited, as described later, and the two flexural vibration modes are combined to generate an elliptical movement at the tips of the protruding portions 3.

Here, the shape of the vibration element 1 is determined in such a manner that the respective resonance frequencies of the above-mentioned two flexural vibration modes approximately coincide with each other. More specifically, the respective resonance frequencies of the two flexural vibration modes can be made to coincide with each other, by appropriately setting the size in the longitudinal direction (longer side) of the driving plate 2 and the size in the direction perpendicular to the longitudinal direction (shorter side) thereof.

The two flexural vibration modes that are caused in the vibration element 1 is described below.

Figure 19A:
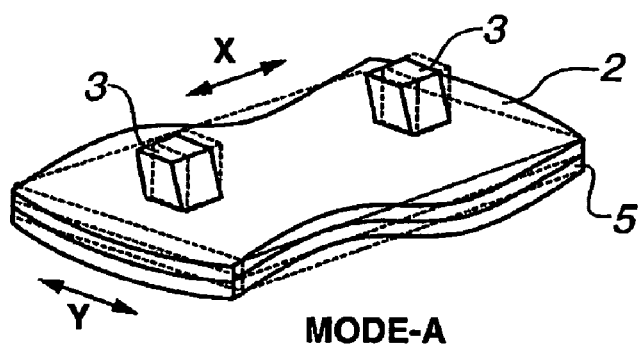
FIGS. 19A and 19B are diagrams illustrating vibration modes of the vibration element of the sixth embodiment.
Figure 19B:
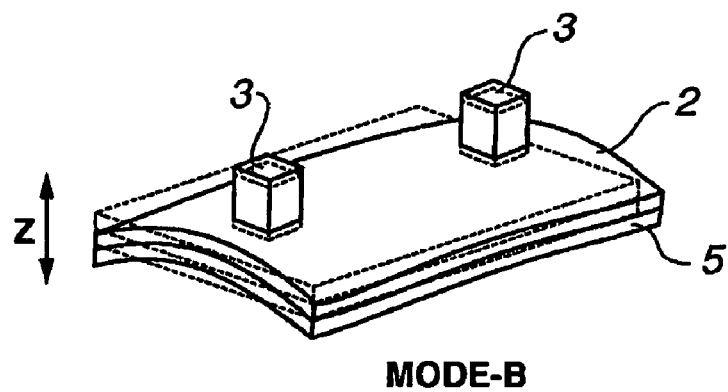

FIGS. 19A and 19B are diagrams illustrating the two flexural vibration modes. As will be understood from FIGS. 19A and 19B, the vibration element 1 of the ultrasonic actuator according to the sixth embodiment has the same vibration modes as those of the vibration element in the first embodiment shown in FIGS. 2A and 2B.

Here, if two protruding portions 3 are disposed symmetrically with respect to the X-Z plane or the Y-Z plane passing through the center of the driving plate 2, the vibration element 1 can impartially receive a reaction force from the slider 6 (see FIG. 20) at the protruding portions 3. Further, since the positional relationship between the slider 6 and the protruding portions 3 becomes stable, it is possible to stabilize an output power of the vibration element 1 without being influenced by changes of environment, load, or the like.

Figure 20:
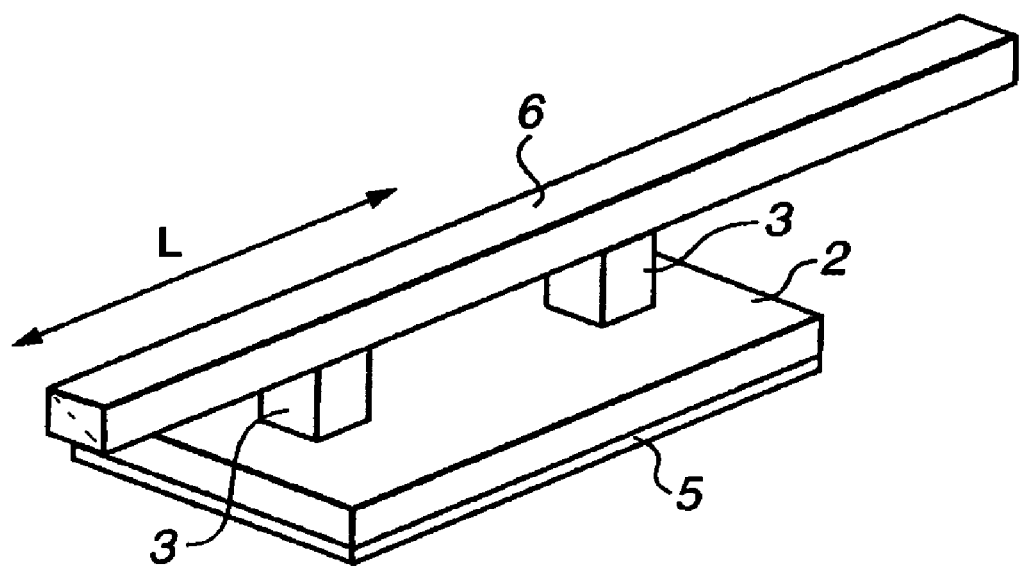
FIG. 20 is a perspective view showing a vibration-type driving device according to the sixth embodiment.

When vibrations in MODE-A and MODE-B as described above are generated with a predetermined phase difference, an elliptical movement can be generated at the tips of the protruding portions 3. The slider 6, which is a driven element, is arranged to be kept in pressure contact with the tips of the protruding portions 3, as shown in FIG. 20. Accordingly, the slider 6 can be moved in the direction of arrow L in response to the elliptical movement of the protruding portions 3.

Figure 21:
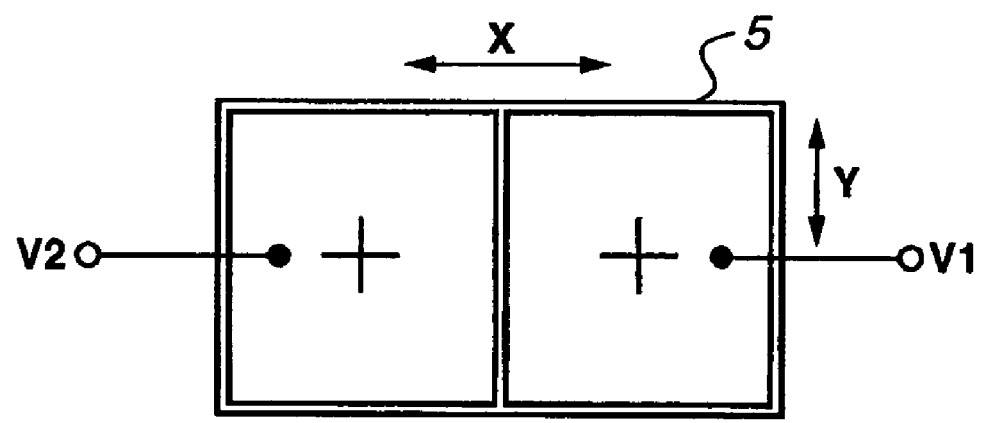
FIG. 21 is a diagram showing the electrode pattern of a piezoelectric element of the sixth embodiment.

FIG. 21 is a diagram showing an electrode pattern of the piezoelectric element according to the sixth embodiment. In FIG. 21, on the piezoelectric element 5, there are formed electrode areas that are obtained by division into two equal parts in the longitudinal direction (X direction) of the piezoelectric element 5. Further, the directions of polarization in the respective electrode areas are the same (+ direction).

To the electrode area located on the right side in FIG. 21 in two electrode areas of the piezoelectric element 5, an alternating voltage (V1) is applied, and to the electrode area located on the left side, an alternating voltage (V2) is applied.

In FIG. 21, assuming that V1 and V2 are alternating voltages having the frequency in the vicinity of the resonance frequency in MODE-A and having the respective phases different by 180°, at a certain moment, a piezoelectric element part in the right-side electrode area contracts and a piezoelectric element part in the left-side electrode area expands. Also, at a different moment, the reverse relation between contraction and expansion is obtained. As a result, the vibration in MODE-A is generated in the vibration element 1.

Further, assuming that V1 and V2 are alternating voltages having the frequency in the vicinity of the resonance frequency in MODE-B and having the same phase, the whole piezoelectric element (two electrode areas) expands at a certain moment and contracts at a different moment. As a result, the vibration in MODE-B is generated in the vibration element 1.

In addition, the direction of polarization in one electrode area of the two electrode areas is set to the (+) direction and the direction of polarization in the other electrode area is set to the (−) direction.

In that event, the vibration in MODE-A can be generated in the vibration element 1 by applying, to the two electrode areas, alternating voltages (V1 and V2) having the frequency in the vicinity of the resonance frequency in MODE-A and having the same phase. Also, the vibration in MODE-B can be generated in the vibration element 1 by applying, to the two electrode areas, alternating voltages (V1 and V2) having the frequency in the vicinity of the resonance frequency in MODE-B and having the respective phases different by 180°.

Figure 22:
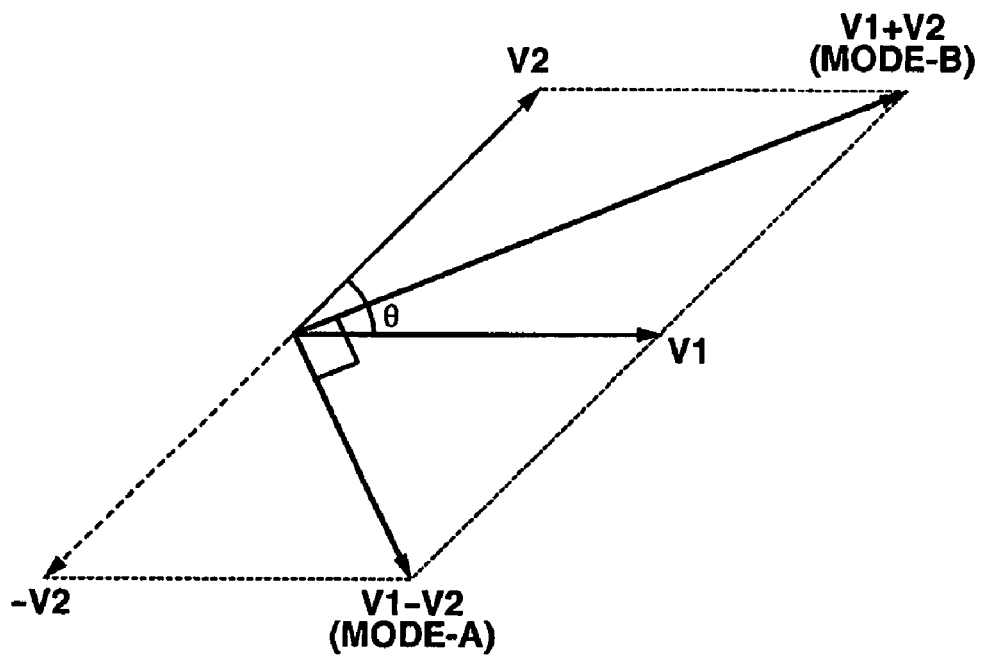
FIG. 22 is a diagram showing, with vectors, the relationship between voltages applied to the piezoelectric element and the vibration modes.

Here, the relationship between the voltages V1 and V2 and the vibration modes MODE-A and MODE-B is described with reference to FIG. 22.

In accordance with the description using FIG. 21 as mentioned above, a combination of vectors of V1 and −V2 becomes a vector representing MODE-A, and a combination of vectors of V1 and V2 becomes a vector representing MODE-B. Here, assuming that the amplitudes of V1 and V2 (magnitudes of vectors of V1 and V2) are the same and the phase difference between V1 and V2 is a phase difference θ between 0° and 180°(0°<θ<180°), it is understood that vectors of (V1+V2) and (V1−V2) are orthogonal, as shown in FIG. 22.

This implies that the vibrations in MODE-A and MODE-B are generated simultaneously and the phase difference thereof is 90°. As a result, an elliptical movement can be generated at the protruding portions 3 on the driving plate 2, so that the slider 6, which is kept in contact with the protruding portions 3, can be driven.

In other words, if the voltage amplitudes of V1 and V2 are made the same and the phase difference θ between V1 and V2 is made other than 0° and 180°, the vibrations in MODE-A and MODE-B can be generated simultaneously and the phase difference thereof becomes either 90° or −90°. Further, if the phase difference θ between V1 and V2 is changed, the amplitudes of vibrations in MODE-A and MODE-B can be changed.

As has been described above, even in the vibration element 1 using such a piezoelectric element 5 that has a simple construction in which an electrode pattern thereof is divided into two equal electrode areas in the longitudinal direction of the vibration element 1 and the directions of polarization of the respective electrode areas are the same, an elliptical movement can be generated at the protruding portions 3 of the vibration element 1.

With the electrode pattern having such a simple construction, the arrangement of wires connected to the electrode areas can be simplified. Further, with the directions of polarization made the same over the entire area of the piezoelectric element, the process is easier as compared with a piezoelectric element having different directions of polarization, and, since the rigidity of the piezoelectric element in the vicinity of the boundary of electrode areas becomes uniform, ideal vibrations can be generated.

Moreover, with the two flexural vibration modes used for the driving of the driven element, the vibration-type driving device can be reduced while preventing natural frequencies from increasing, as compared with another vibration-type driving device that drives a driven element by means of a combination of flexural vibration and longitudinal vibration.

Although not discussed, it should be noted that the invention is not limited to combination of a secondary flexural vibration mode (MODE-A) and a primary flexural vibration mode (MODE-B) to drive the driven element.

More specifically, any kind of flexural vibration mode (a flexural vibration mode of different order) may be used as long as an elliptical movement can be generated by the combination of a mode that is caused when alternating voltages having a phase difference of 0° are applied as V1 and V2 and a mode that is caused when alternating voltages having a phase difference of 180° are applied as V1 and V2.

Also, it should be noted that the layout and number of protruding portions 3 might be adequately set. For example, one protruding portion 3 may be provided on the center of the driving plate 2 as shown in FIG. 23, or four protruding portions 3 may be provided on the driving plate 2 as shown in FIG. 25.

Figure 23:
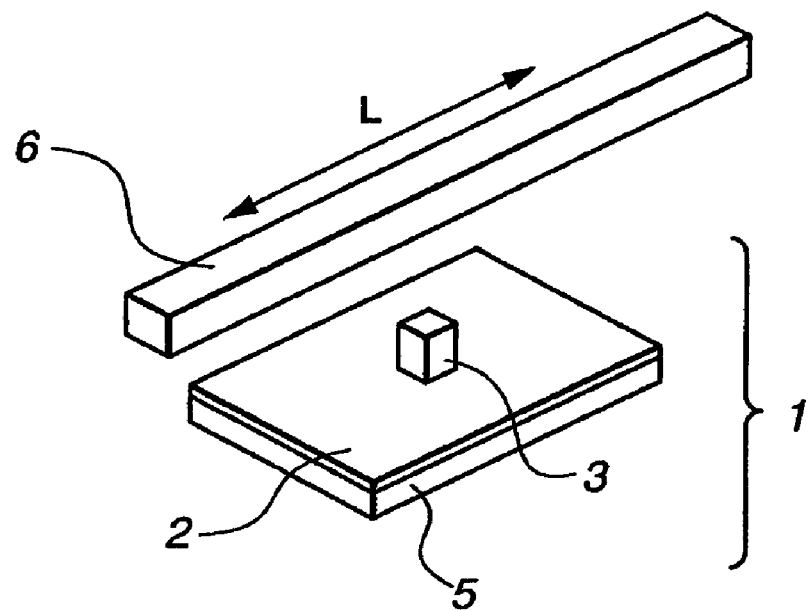
FIG. 23 is a perspective view showing a vibration-type driving device as an example of modification of the sixth embodiment.
Figures 24A, 24B:
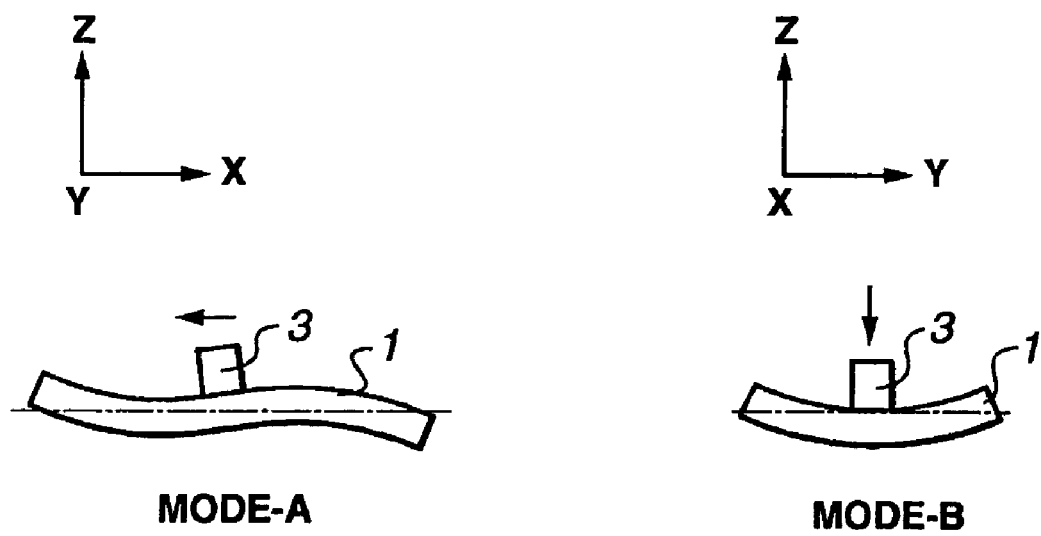
FIGS. 24A and 24B are diagrams illustrating vibration modes of the vibration element of the vibration-type driving device shown in FIG. 23.

In the vibration element 1 shown in FIG. 23, the protruding portion 3 makes a reciprocating motion in the X direction as shown in FIG. 24A in response to the vibration in MODE-A, and makes a reciprocating motion in the Z direction as shown in FIG. 24B in response to the vibration in MODE-B. Then, the vibrations in MODE-A and MODE-B are combined to generate an elliptical movement at the tip of the protruding portion 3, so that the slider 6 is moved in the direction of arrow L.

Here, since the protruding portion 3 is disposed in the vicinity of a position where a node in MODE-A is generated and an antinode in MODE-B is generated, the degrees of displacement of the protruding portion 3 both in the X direction and the Z direction become large, so that a larger driving force can be exerted on the slider 6.

Figure 25:
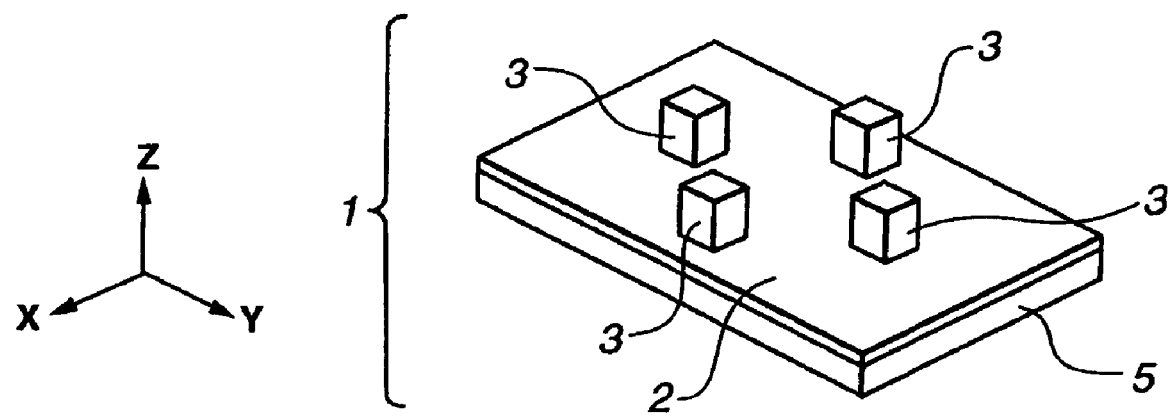
FIG. 25 is a perspective view showing a vibration-type driving device as another example of modification of the sixth embodiment.
Figure 26A:
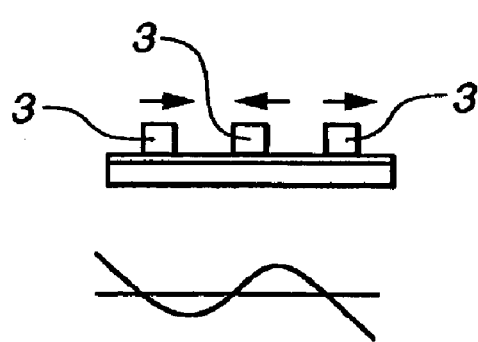
FIGS. 26A and 26B are diagrams illustrating vibration modes of the vibration element of the vibration-type driving device shown in FIG. 25.
Figure 26A:
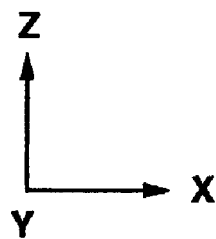
Figure 26B:
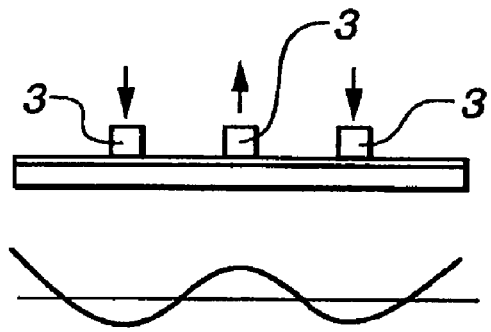
Figure 26B:
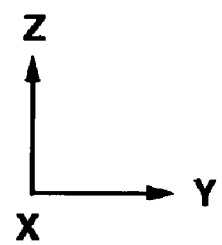

Also, in the vibration element 1 shown in FIG. 25, the protruding portions 3 each make a reciprocating motion in the X direction as shown in FIG. 26A in response to the vibration in MODE-A, and make a reciprocating motion in the Z direction as shown in FIG. 26B in response to the vibration in MODE-B. Then, the vibrations in MODE-A and MODE-B are combined to generate an elliptical movement at the tips of the protruding portions 3, so that a driven element (not shown) that is kept in contact with the protruding portions 3 is driven in the Y direction.

Here, since each of the four protruding portions 3 is disposed in the vicinity of a position where a node in MODE-A is generated and an antinode in MODE-B is generated, the degrees of displacement of the protruding portions 3 both in the X direction and the Z direction become large.

Further, while, in the sixth embodiment, the case where a driven element (slider 6) formed into a bar shape as shown in FIG. 20 is kept in contact with the protruding portions 3 has been described, the invention is not limited to such a case, and a variety of shapes of driven elements may be employed.

(Seventh Embodiment)

In a seventh embodiment of the invention, the structural arrangement of the vibration-type driving device is similar to that described in the sixth embodiment and is, therefore, omitted from the following description.

In the seventh embodiment, the linear-type ultrasonic actuator of the sixth embodiment is used as a drive source in a lens unit for a video camera, which is electronic equipment. The sectional view (sectional view as cut through in a direction perpendicular to the optical axis) of the lens unit is shown in FIG. 27.

Figure 27:
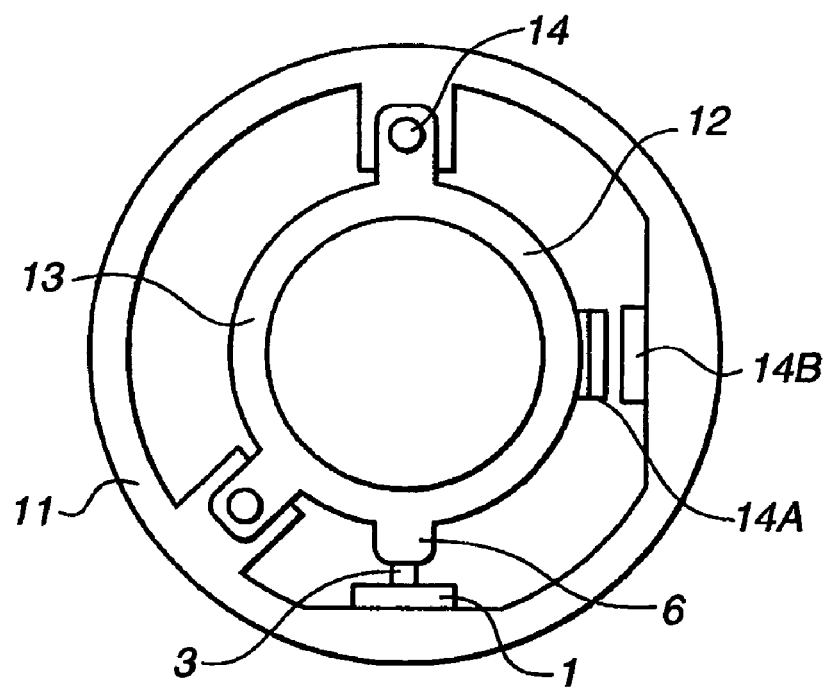
FIG. 27 is a diagram showing the mechanism of a lens unit according to a seventh embodiment of the invention.

In FIG. 27, reference numeral 11 denotes a lens barrel. Reference numeral 12 denotes a lens (photo-taking lens), which is held by a frame 13. Reference numeral 14 denotes a shaft, which is used as a guide functioning when the lens 12 is moved in the optical-axis direction (a direction perpendicular to the drawing surface of FIG. 27). Here, the lens 12 is movable in the optical-axis direction to change the focal length of a photographic optical system.

Reference numeral 1 denotes a vibration element of the ultrasonic actuator described in the sixth embodiment, in which protruding portions 3 thereof are arranged to be kept in contact with a slider 6 provided on the frame 13.

Reference numerals 14A and 14B denote an encoder scale and a light projecting-and-receiving element, respectively, which constitute a known encoder for detecting the position in the optical-axis direction of the lens 12. In the encoder, the light projecting-and-receiving element 14B projects light onto the encoder scale 14A and, then, the light projecting-and-receiving element 14B reads reflected light from the encoder scale 14A, thereby detecting positional information of the lens 12.

Figure 28:
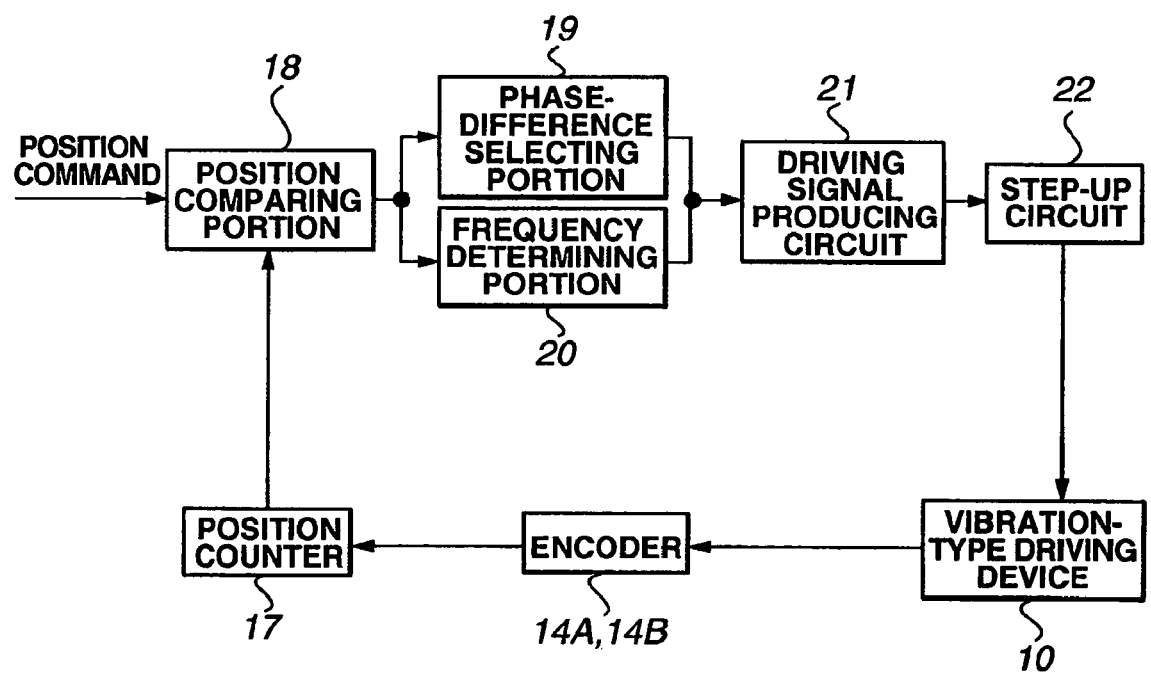
FIG. 28 is a block diagram illustrating a control apparatus of the seventh embodiment.

Next, a control method for the ultrasonic actuator is described. FIG. 28 is a block diagram illustrating a control apparatus in the seventh embodiment.

In FIG. 28, reference numeral 10 denotes an ultrasonic actuator serving as a vibration-type driving device. Positional information of the lens 12, which is driven by the ultrasonic actuator 10, is detected by the encoder (the encoder scale 14A and the light projecting-and-receiving element 14B shown in FIG. 27) and is then measured by a position counter 17. The positional information of the lens 12 measured by the position counter 17 is compared, at a position comparing portion 18, with a position command as externally input. A comparison result obtained at the position comparing portion 18 is input to a phase-difference selecting portion 19 and a frequency determining portion 20. The position comparing portion 18, the phase-difference selecting portion 19 and the frequency determining portion 20 in combination function as an arithmetic circuit for controlling the driving speed of the ultrasonic actuator 10.

As has been described in the sixth embodiment, if the amplitudes of two alternating voltages (V1 and V2) to be applied to two electrodes of the ultrasonic actuator 10 (piezoelectric element) are made the same and the phase difference θ between the two alternating voltages (V1 and V2) is made other than 0° and 180°, the vibrations in MODE-A and MODE-B with a phase difference thereof being 90° are generated in the vibration element 1.

Here, the magnitude of amplitudes (Aa) and (Ab) of the vibrations in MODE-A and MODE-B respectively are given by equations 1 and 2 below. The amplitudes are caused when the phase difference θ between the two alternating voltages (V1 and V2) is an arbitrary value (from 0° to 180°).

$$Aa = |2 \times \cos((\pi - \theta)/2)| \qquad (1)$$

$$Ab = |2 \times \cos(\theta/2)| \qquad (2)$$

Figure 29:
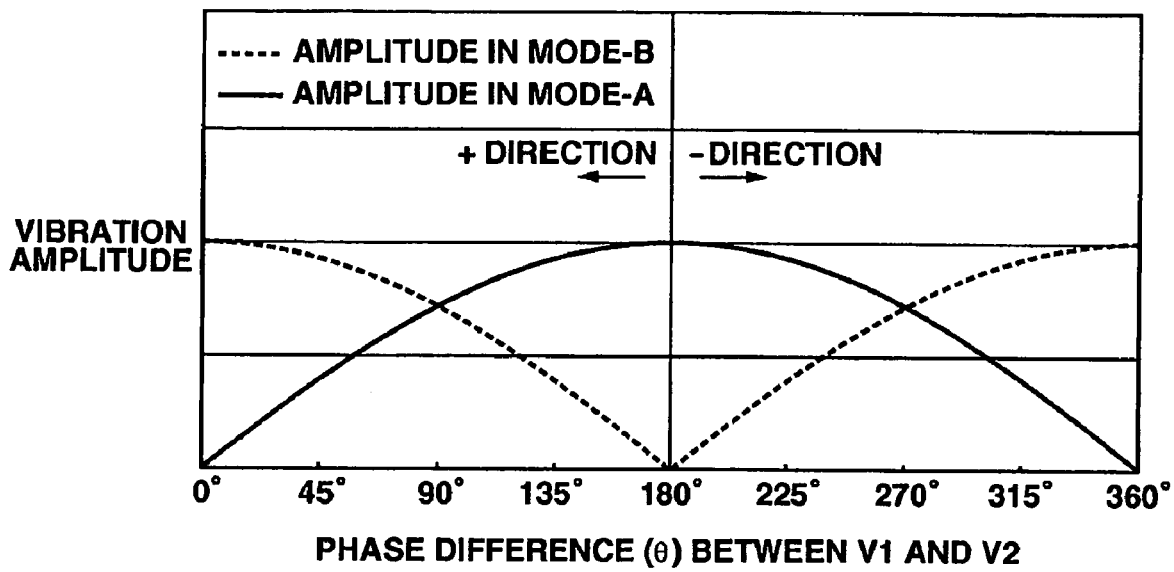
FIG. 29 is a diagram showing the relationship between the phase difference of applied voltages and the vibration amplitude of the seventh embodiment.

FIG. 29 shows the relationship between the vibration amplitudes in MODE-A and MODE-B obtained by the above equations (1) and (2) and the phase difference θ between the two alternating voltages (V1 and V2). In FIG. 29, the abscissa axis indicates the phase difference θ, and the ordinate axis indicates the magnitudes of vibration amplitudes in the two vibration modes (MODE-A and MODE-B). In addition, a phase difference between the vibrations in MODE-A and MODE-B switches between 90° and −90° with the phase difference of 180° between V1 and V2 set as a boundary. In other words, the direction of driving of the driven element (slider 6) is reversed between the two sides (in the + direction and in the − direction shown in FIG. 29) of the phase difference of 180° between V1 and V2.

Here, the direction of driving of the slider 6 by the ultrasonic actuator is determined by comparing, at the position comparing portion 18, the positional information of the lens 12 obtained from the position counter 17 with a target position (stopping position) of the lens 12 indicated by the externally-input position command. Then, in accordance with the direction of driving as determined, the phase difference θ between V1 and V2 is selected at the phase-difference selecting portion 19. More specifically, if the direction of driving of the slider 6 is set to the (+) direction, the phase difference θ of V2 from V1 is made 90°, and, if the direction of driving is set to the (−) direction, the phase difference θ of V2 from V1 is made 270°.

It should be noted that, although it is possible to drive the lens 12 even with a phase difference θ other than 90° and 270°, in the seventh embodiment, 90° and 270°, each of which is a phase difference θ that causes the amplitudes of vibrations in MODE-A and MODE-B to be generated uniformly, are selected.

Figure 30:
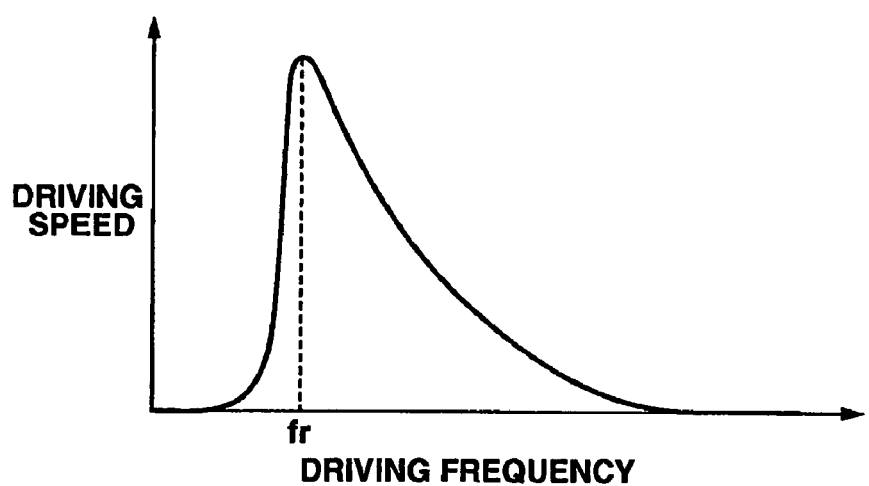
FIG. 30 is a diagram showing the relationship between the driving frequency and the driving speed of a vibration-type driving device of the seventh embodiment.

Next, a control method for the driving frequency is described. The relationship between the driving frequency of an alternating voltage (V1, V2) applied to the ultrasonic actuator 10 and the driving speed is the same as that in a typical ultrasonic actuator using resonance, and has such characteristics that, as shown in FIG. 30, with a resonance frequency (fr) set as a peak, the driving speed decreases moderately on the higher-frequency side of the resonance frequency (fr) and decreases rapidly on the lower-frequency side of the resonance frequency (fr).

If the driving speed is controlled with the above-mentioned characteristics, the driving control should be accomplished with frequencies in the frequency range higher than the resonance frequency (fr).

At the position comparing portion 18, a deviation of the current position of the lens 12 based on the output of the position counter 17 from the externally-input target position is measured. At the frequency determining portion 20, if the above-mentioned deviation is large, the driving frequency is made closer to the resonance frequency (fr), thereby increasing the driving speed. On the other hand, if the deviation is small, the driving frequency is made further from the resonance frequency (fr) toward the higher-frequency side, thereby decreasing the driving speed.

In addition, the driving control may be arranged such that, if the deviation of the position of the lens 12 is within a predetermined range, the alternating voltages (V1 and V2) are not applied to the ultrasonic actuator.

At the driving signal producing circuit 21, two signals (corresponding to V1 and V2) having the phase difference θ selected by the phase-difference selecting portion 19 and having the frequency determined by the frequency determining portion 20 are produced. The two driving signals are stepped up by the step-up circuit 22 to a voltage enabling the ultrasonic actuator to operate.

The alternating voltages (V1 and V2) as stepped up are applied to the ultrasonic actuator 10 (piezoelectric element). According to the above-described construction, a lens unit that the lens 12 is able to quickly move to a target position can be provided.

(Eighth Embodiment)

As noted above, the driving speed is made to change by varying, in accordance with a difference between the current position of the lens 12 and the target position, the frequency of the alternating voltage (V1, V2) to be applied to the ultrasonic actuator serving as a vibration-type driving device. Further, either 90° or 270° is selected as a phase difference θ between the applied voltages V1 and V2 in accordance with the driving direction of a driven element (slider 6).

Figure 31A:
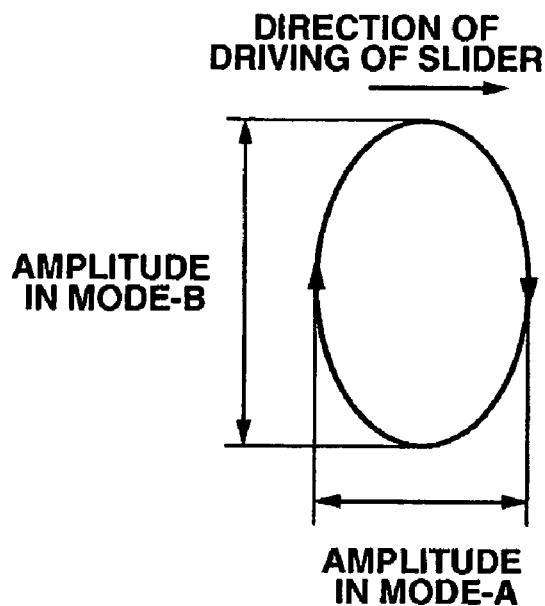
FIGS. 31A and 31B are diagrams for explaining an elliptical movement of protruding portions of the vibration-type driving device of the seventh embodiment.
Figure 31B:
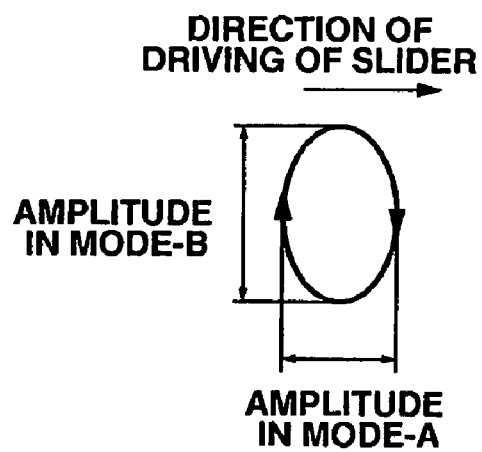

In that event, an elliptical movement that is generated at the protruding portions (3 in FIG. 18) of the vibration element comes into such a driving state that the ratio of the amplitude in MODE-A, which is the amplitude in the lateral direction of the elliptical movement, to the amplitude in MODE-B, which is the amplitude in the longitudinal direction thereof, does not vary and only the magnitude of each of the amplitudes in MODE-A and MODE-B varies, as shown in FIGS. 31A and 31B.

In the event that it is intended to drive the lens 12 at a lower speed, the above-mentioned driving method described in the seventh embodiment causes the amplitude in MODE-B to be too small (see FIG. 31B), so that the protruding portions 3 might come into contact with the slider 6 at the lower side of the elliptical movement, i.e., even at the time of a movement in the direction opposite to the driving direction of the slider 6, and a stable low-speed driving operation may be un-obtainable.

An eighth embodiment of the invention is to further improve the seventh embodiment so as to realize a stable low-speed driving operation. The control method in the eighth embodiment is described below.

It should be noted that, in the eighth embodiment, the construction of the ultrasonic actuator is the same as that described in the sixth embodiment, and such an ultrasonic actuator is incorporated into the lens unit described in the seventh embodiment.

In order to drive the ultrasonic actuator stably at a low speed, it is conceivable to make the amplitude in MODE-B, which is the vibration in a direction to push up the slider 6, larger and the amplitude in MDOE-A, which is the vibration in a direction to drive the slider 6, smaller.

Figure 32A:
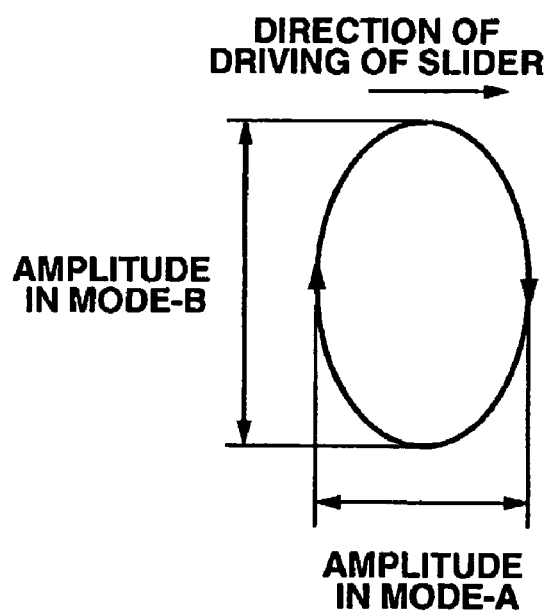
FIGS. 32A and 32B are diagrams for explaining an elliptical movement of protruding portions of a vibration-type driving device according to an eighth embodiment of the invention.
Figure 32B:
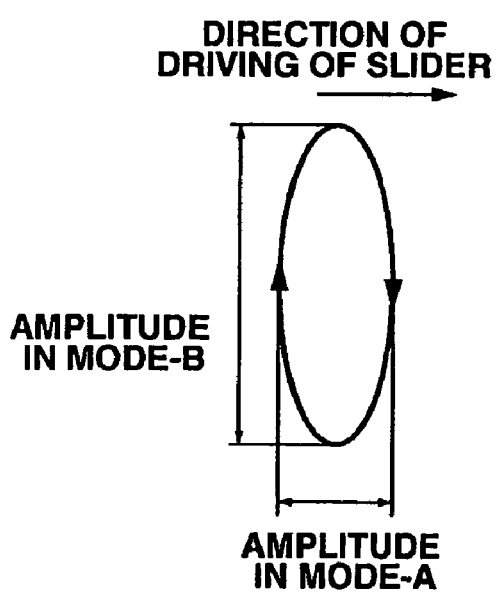

For example, if, as shown in FIGS. 32A and 32B, the driving speed of the slider 6 is controlled in such a way as to make the amplitude in MODE-B unvarying and the amplitude in MODE-A variable, the slider 6 can be stably driven in a wide range from high-speed driving to low-speed driving.

Figure 33:
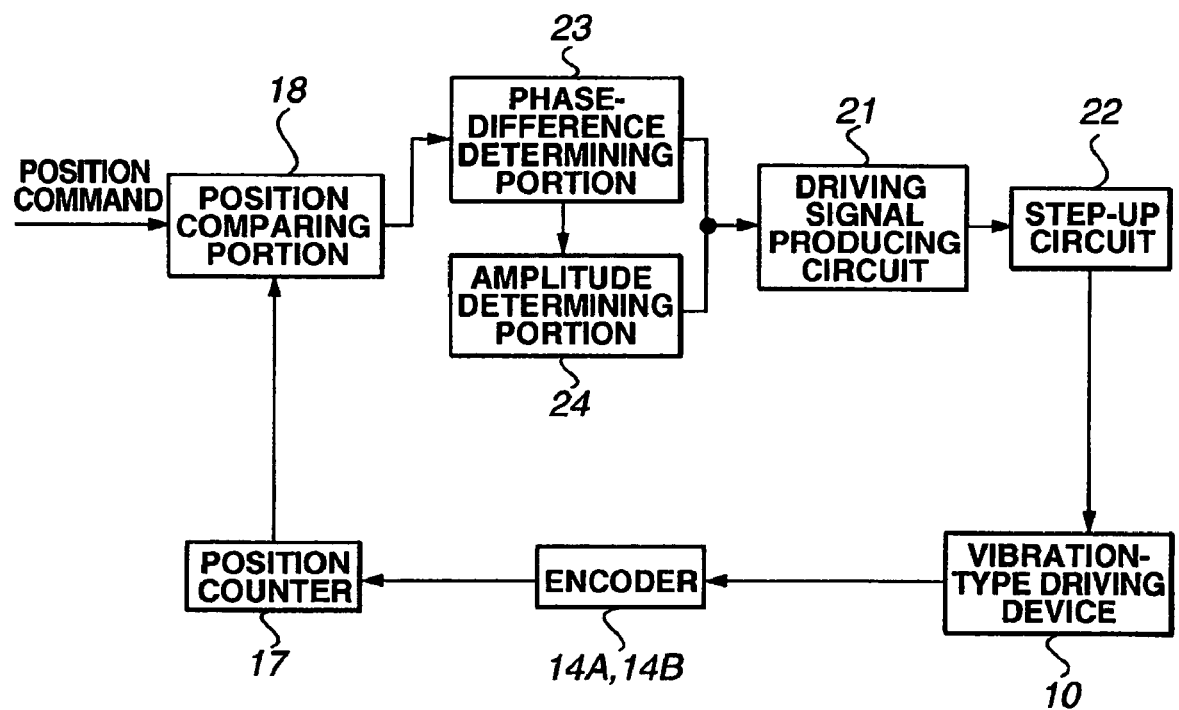
FIG. 33 is a block diagram illustrating a control apparatus of the eighth embodiment.

FIG. 33 is a block diagram illustrating a control apparatus of the eighth embodiment. The control apparatus provides a phase-difference determining portion 23 and an amplitude determining portion 24. Thus, the position comparing portion 18, the phase-difference determining portion 23 and the amplitude determining portion 24 in combination function as an arithmetic circuit for controlling the driving speed of the ultrasonic actuator 10. The other features are similar to those described in the seventh embodiment.

In the eighth embodiment, the frequency of each of the alternating voltages (V1 and V2) to be applied to the ultrasonic actuator is fixed to a predetermined frequency about the resonance frequency (fr), and, then, the phase difference θ between V1 and V2 and the amplitude of each of V1 and V2 are managed so as to control the driving speed.

While, as has been described in the seventh embodiment, the relationship of the amplitudes in MODE-A and MODE-B to the phase difference θ between the voltages (V1 and V2) to be applied to electrodes of the piezoelectric element in the ultrasonic actuator becomes such a relationship as shown in FIG. 29, this is true in a case where the voltage amplitude of each of V1 and V2 is steadied within a range of the phase difference θ from 0° to 180°.

In that case, the amplitude in MODE-B would vary according to the phase difference θ, as is indicated by a dotted line in FIG. 29. Therefore, in the eighth embodiment, the amplitude in MODE-B is steadied by varying the amplitude of each of the applied voltages (V1 and V2) according to the phase difference θ.

Figure 34:
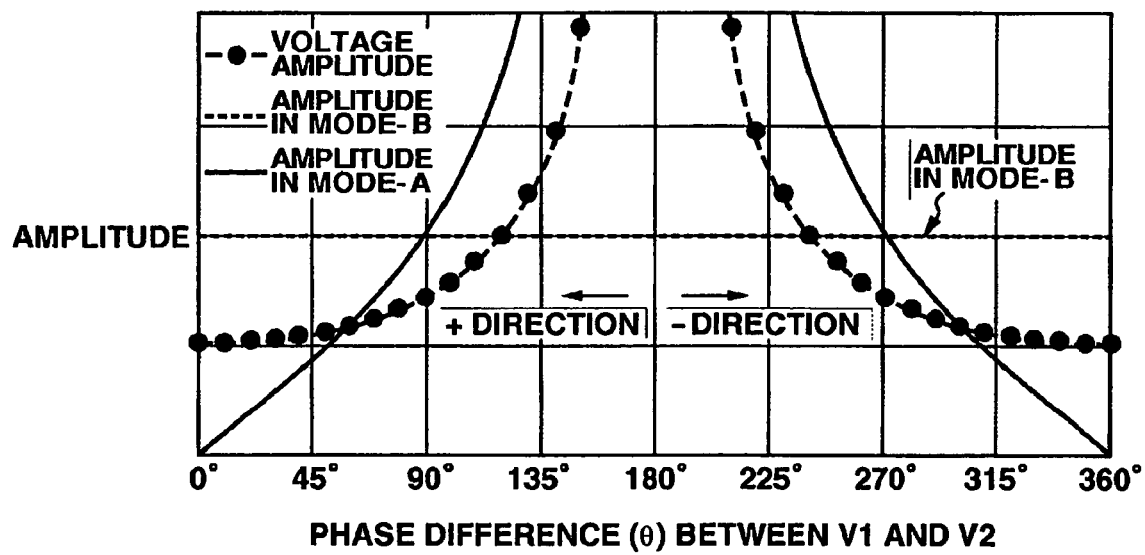
FIG. 34 is a diagram showing the relationship between the phase difference of applied voltages and the vibration amplitude of the eighth embodiment.
Figure 35A:
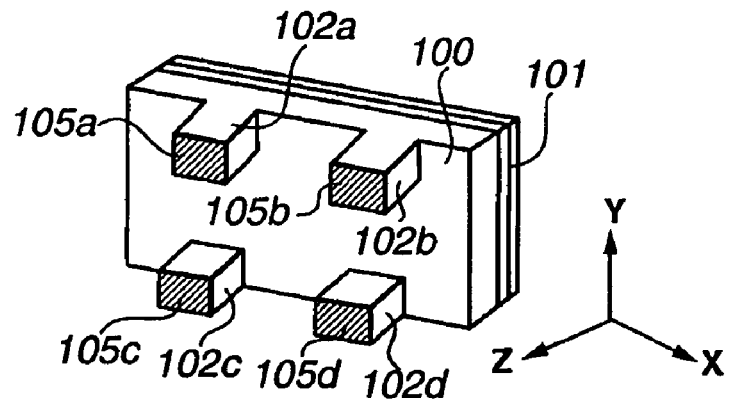
FIGS. 35A, 35B and 35C are perspective views showing a vibration element according to the related art.
Figure 35B:
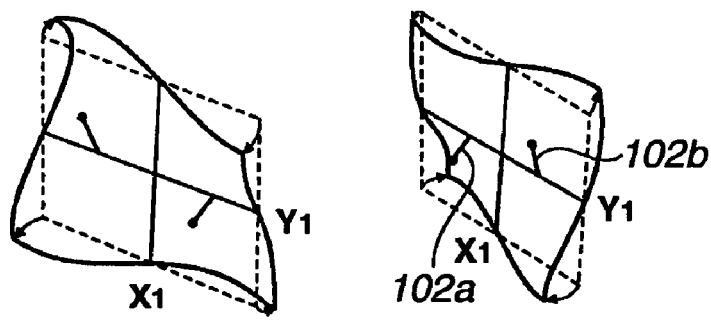
Figure 35C:
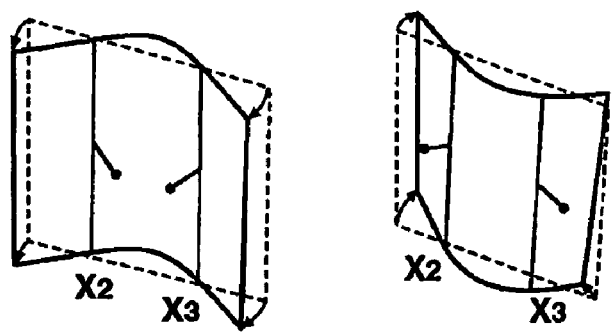

FIG. 34 shows the behavior of the vibration amplitude obtained when the applied voltage (V1 and V2) amplitude is varied according to the phase difference θ between V1 and V2 so that the amplitude in MODE does not vary. Each voltage amplitude on a line connecting the circle marks shown in FIG. 34 is proportional to a reciprocal of the amplitude in MODE-B shown in FIG. 29 and is used to compensate for variation of the amplitude in MODE-B. More specifically, the voltage amplitude of each of V1 and V2 is obtained with multiplication by a coefficient (K) obtained by the following equation (3) according to the phase difference θ:

$$K=|1/(2\times\cos(\theta/2))| \quad (3)$$

The individual voltage amplitudes obtained by using equation (3), above, come into such a relationship as represented by circle marks shown in FIG. 34. The voltages having the thus-obtained amplitude are applied to two electrodes of the piezoelectric element, so that the amplitude in MODE-B becomes a constant amplitude as indicated by a dotted line shown in FIG. 34.

In this instance, the amplitude in MODE-A comes to have such characteristics as to increase with the phase difference θ advancing from 0° toward 180° and to decrease with the phase difference θ advancing from 180° toward 360°, as indicated by solid lines shown in FIG. 34. It should be noted that, like FIG. 29, the driving directions are made opposite between the right side (the side of the − direction) and the left side (the side of the + direction) of FIG. 34 with the phase difference 180° set as a boundary.

In the eighth embodiment, a description of the driving control operation is as follows. First, at the position comparing portion 18, the current position of the lens 12 is compared with a target position. At the phase-difference determining portion 23, the driving direction is determined on the basis of a result of comparison provided by the position comparing portion 18, and it is determined whether to set the phase difference θ between V1 and V2 to a value within a range in which the phase difference θ is smaller than 180° (the range of the + direction in FIG. 34) or to a value within a range in which the phase difference θ is larger than 180° (the range of the − direction in FIG. 34).

Further, at the phase-difference determining portion 23, the phase difference θ is determined in such a way as to make the driving speed equal the difference in distance between the current position of the lens 12 and the target position.

For example, if the lens 12 (slider 6) is to be driven in the (+) direction and the driving speed is to be set high, the phase difference θ is determined to be a large value within the range in which the phase difference θ is smaller than 180°. If the driving speed is to be set low, the phase difference θ is determined to be a small value within the range in which the phase difference θ is smaller than 180°. In this range, the amplitude in MODE-B is constant and the amplitude in MODE-A increases with the phase difference θ advancing from 0° toward 180°, so that the driving control operation can be stably driven from low-speed driving up to high-speed driving.

On the other hand, if the lens 12 (slider 6) is to be driven in the (−) direction and the driving speed is to be set to a high speed, the phase difference θ is determined to be a small value within the range in which the phase difference θ is larger than 180°. If the driving speed is to be set to a low speed, the phase difference θ is determined to be a large value within the range in which the phase difference θ is larger than 180°. In the range in which the phase difference θ is larger than 180°, the amplitude in MODE-B is constant and the amplitude in MODE-A increases with the phase difference θ advancing from 360° toward 180°, so that it is viable to perform the driving control operation stably from low-speed driving up to high-speed driving.

After the phase difference θ is determined at the phase-difference determining portion 23, at the amplitude determining portion 24, a voltage amplitude corresponding to the phase difference θ as determined (a value on the line connecting circle marks shown in FIG. 34) is determined. The voltage amplitude to be determined may be obtained by using equation (3) according to the phase difference θ, and, alternatively, may be obtained from data representative of the relationship between a plurality of phase differences θ and a plurality of voltage amplitudes, which are previously stored in a storage circuit.

Then, data representative of both the value of the phase difference θ as determined at the phase-difference determining portion 23 and the value of the voltage amplitude as determined at the amplitude determining portion 24 are input and provided to the driving signal producing circuit 21 to produce a driving signal based on the data input. The driving signal is then supplied to the step-up circuit 22, at which voltages (V1 and V2) as stepped up are formed and supplied to the piezoelectric element of the ultrasonic actuator.

In the above-described driving control operation, since the amplitude of the vibration in MODE-B, which is a vibration in a direction to push up the slider 6 among vibrations of the ultrasonic actuator, is made steady and the amplitude of the vibration in MODE-A is varied, the slider 6 can be stably driven in a wide range from high-speed driving to low-speed driving.

The invention has been described in detail with particular reference to certain preferred embodiments thereof, but it is understood that variations and modifications can be effected within the scope of the invention as described above, and as noted in the appended claims, by a person of ordinary skill in the art without departing from the scope of the invention.

What is claimed is:

1. A vibration-type driving device comprising:
   a vibration element including:
     a driving member; and
     an electro-mechanical energy conversion element having an electrode, the electro-mechanical energy conversion element being configured to use a driving signal from the electrode to displace the driving member; and
   a driven element in contact with the driving member of said vibration element, wherein said vibration element uses the driving signal so as to generate first vibrations in a first flexural vibration mode and second vibrations in a second flexural vibration mode different from the first flexural vibration mode and to form vibrations combining the first and second vibrations, wherein a direction of a node generated in the first flexural vibration mode is non-parallel to a direction of a node generated in the second flexural vibration mode.

2. A vibration-type driving device according to claim 1, wherein the direction of node generated in the first flexural vibration mode is perpendicular to the direction of the node generated in the second flexural vibration mode.

3. A vibration-type driving device according to claim 2, wherein said driving member is composed of a protrusion.

4. A vibration-type driving device according to claim 2, wherein said driving member is disposed in a position where the node in the first flexural vibration mode is generated and an antinode in the second flexural vibration mode is generated.

5. A vibration-type driving device according to claim 2, wherein said driving member is disposed in the vicinity of a position where the node in the first flexural vibration mode is generated and an antinode in the second flexural vibration mode is generated.

6. A vibration-type driving device according to claim 2, wherein the order of the first flexural vibration mode is an even-number-th order, and the order of the second flexural vibration mode is an odd-number-th order.

7. A vibration-type driving device according to claim 2, wherein said electro-mechanical energy conversion element is piezoelectric composed of a plurality of layers.

8. A vibration-type driving device according to claim 7, wherein said piezoelectric element has a plurality of driving regions that receive respective different driving signals as externally input, and the plurality of driving regions each are subjected to polarization treatment in the thickness direction of said piezoelectric element.

9. A vibration-type driving device according to claim 7, wherein said piezoelectric element has two driving regions to excite vibrations in the first and second flexural vibration modes, and the two driving regions are formed in positions into which said piezoelectric element is divided in the thickness direction thereof and are arranged to generate excitation forces in opposite directions in response to inputting of the driving signal.

* * * * *